(12) United States Patent
Pinkston et al.

(10) Patent No.: US 12,071,103 B2
(45) Date of Patent: *Aug. 27, 2024

(54) COLLAPSIBLE CARGO PLATFORM

(71) Applicant: HORIZON GLOBAL AMERICAS INC., Plymouth, MI (US)

(72) Inventors: David Lester Pinkston, Novi, MI (US); Kunal Deulkar, Plymouth, MI (US); Gregoire P. Mercier, Plymouth, MI (US); Curt Nowack, Plymouth, MI (US)

(73) Assignee: HORIZON GLOBAL AMERICAS INC., Plymouth, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/100,033

(22) Filed: Jan. 23, 2023

(65) Prior Publication Data

US 2023/0406216 A1 Dec. 21, 2023

Related U.S. Application Data

(63) Continuation of application No. 17/226,792, filed on Apr. 9, 2021, now Pat. No. 11,560,099.

(60) Provisional application No. 63/007,635, filed on Apr. 9, 2020.

(51) Int. Cl.
*B60R 9/06* (2006.01)
(52) U.S. Cl.
CPC ..................... *B60R 9/06* (2013.01)

(58) Field of Classification Search
CPC .......................................................... B60R 9/06
USPC ........................................................... 224/555
See application file for complete search history.

(56) References Cited

U.S. PATENT DOCUMENTS

| | | | | |
|---|---|---|---|---|
| 1,686,450 A | * | 10/1928 | Henry | B60R 5/041 224/510 |
| 1,743,220 A | * | 1/1930 | Johnson | B60R 9/06 224/511 |
| 1,838,500 A | * | 12/1931 | Russell | B60R 9/06 224/508 |
| 1,941,860 A | * | 1/1934 | Hanson | B60R 5/041 224/500 |
| 5,823,595 A | * | 10/1998 | Tronco | B60P 3/14 296/57.1 |
| 6,196,612 B1 | * | 3/2001 | Grimes | B60N 2/24 296/65.01 |
| 6,382,486 B1 | * | 5/2002 | Kretchman | B60R 9/06 224/498 |

(Continued)

*Primary Examiner* — Peter N Helvey

(57) ABSTRACT

The disclosure relates generally to a cargo platform designed to be used in connection with a trailer hitch and, more particularly, to a cargo platform designed to be collapsible. A cargo platform has an open position and a closed position. The cargo platform includes a frame with a front portion, a rear portion, first and second stationary side portions coupled to the front portion, first and second rotatable side portions, a first hinge element to rotatably could the first rotatable side portion to the rear portion, a second hinge element to rotatably could the second rotatable side portion to the rear portion, and a foldable floor. The foldable floor includes a first floor, second floor rotatably connected to the first floor, and a third floor rotatably connected to the second floor. The first floor is coupled to the front portion. The third floor is coupled to the rear portion.

20 Claims, 23 Drawing Sheets

(56) References Cited

U.S. PATENT DOCUMENTS

| | | | | |
|---|---|---|---|---|
| 7,246,733 | B2* | 7/2007 | Threet | B60R 9/06 224/498 |
| 8,302,829 | B2* | 11/2012 | Lee | B60R 9/10 224/489 |
| RE44,454 | E * | 8/2013 | Aghajanian | B60R 9/06 224/527 |
| 8,556,145 | B1* | 10/2013 | Ezra | B60R 9/045 224/498 |
| 9,027,809 | B1* | 5/2015 | Ezra | B60R 9/06 224/499 |
| 10,953,808 | B2* | 3/2021 | Hyatt | B60R 9/06 |
| 11,208,050 | B1* | 12/2021 | Baranda | B60R 9/06 |
| 2003/0173387 | A1* | 9/2003 | Mitchell | B60R 9/06 224/499 |
| 2007/0175938 | A1* | 8/2007 | Swenson | B60R 9/06 224/498 |
| 2009/0056592 | A1* | 3/2009 | Threet | B60R 9/06 108/11 |
| 2010/0001029 | A1* | 1/2010 | Tai | B60R 9/06 224/510 |
| 2019/0135189 | A1* | 5/2019 | Clark | B60R 9/06 |
| 2020/0094748 | A1* | 3/2020 | Garceau | B60R 9/10 |

* cited by examiner

COLLAPSIBLE CARGO PLATFORM

RELATED APPLICATIONS

This application is a continuation of U.S. patent application Ser. No. 17/226,792, filed Apr. 9, 2021 and entitled, "COLLAPSIBLE CARGO PLATFORM," which claims priority to U.S. Provisional Application No. 63/007,635, filed Apr. 9, 2020, the entireties of each of which are herein incorporated by reference.

FIELD OF THE INVENTION

The present invention relates generally to a cargo platform, tray or basket designed to be used in connection with a trailer hitch and, more particularly, to a cargo platform, tray or basket designed to be collapsible to allow a user to use the cargo platform, tray or basket in a fully extended state, a fully collapsed state, or any partially extended state therebetween.

BACKGROUND

The towing industry has developed platform and/or baskets that are designed to be used in conjunction with a trailer hitch. When a vehicle transports cargo or material, advantages can be obtained if loading of the material to be transported can be facilitated, without interfering with the other functions of the vehicle. Typically, it is common to use a mounting for a trailer hitch to secure a cargo platform to a vehicle.

As a result, many such cargo platforms are known to facilitate such procedures. However, these devices tend to be bulky and clumsy. To overcome one disadvantage of fixed cargo trays and/or cargo baskets collapsible devices are known. However, these devices lack the strength or durability, and ease of use, that is desirable to the end user.

Furthermore, such devices which help the vehicle carry cargo tend to interfere with the use and the enjoyment of the vehicle. For example, storage of the device may be a problem as a device that does not collapse can protrude undesirably from the back of a vehicle. Also, the cargo platform may interfere with the operation of the trunk or the rear tailgate of the vehicle.

Accordingly, there is a need in the art for an improved collapsible cargo platform, tray or basket.

SUMMARY

The present invention relates generally to a cargo platform (sometimes referred to as a "cargo tray" or "cargo basket" designed to be used in connection with a trailer hitch and, more particularly, to a cargo platform designed to be collapsible to allow a user to use the cargo platform in a fully extended state, a fully collapsed state, or any partially extended state therebetween.

A cargo platform has an open position and a closed position. The cargo platform includes a frame with a front portion, a rear portion, first and second stationary side portions coupled to the front portion, first and second rotatable side portions, a first hinge element to rotatably could the first rotatable side portion to the rear portion, a second hinge element to rotatably could the second rotatable side portion to the rear portion, and a foldable floor. The foldable floor includes a first floor, second floor rotatably connected to the first floor, and a third floor rotatably connected to the second floor. The first floor is coupled to the front portion. The third floor is coupled to the rear portion.

DESCRIPTION OF THE DRAWINGS

Operation of the present teachings may be better understood by reference to the detailed description taken in connection with the following illustrations. These appended drawings form part of this specification, and written information in the drawings should be treated as part of this disclosure. In the drawings.

DESCRIPTION OF THE INVENTION

Figure 1A:
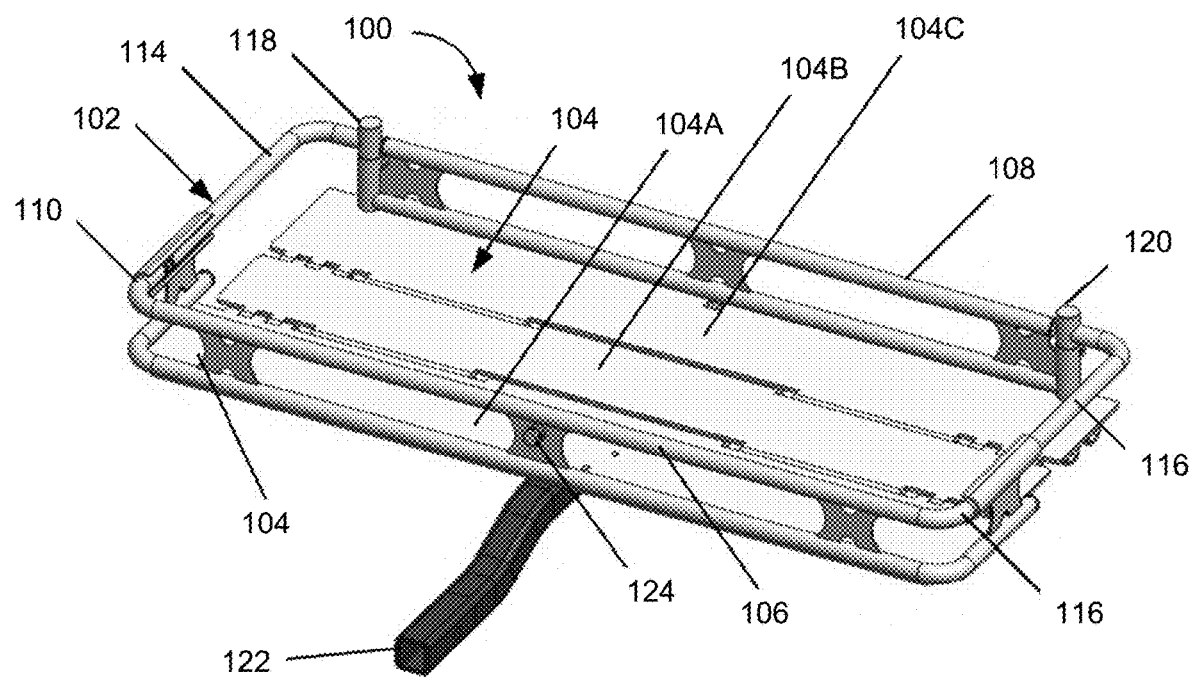
FIGS. 1A and 1B illustrate perspectives view of a cargo platform, according to the teachings of this disclosure.

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

The present invention relates generally to a cargo platform (sometime referred to as a "cargo tray" or "cargo basket") designed to be used in connection with a trailer hitch and, more particularly, to a cargo platform designed to be collapsible to allow a user to use the cargo platform in a fully extended state, a fully collapsed state, or any partially extended state therebetween.

As described below, a cargo platform transition between an open position configured to carry cargo and a closed positioned where the cargo platform has a reduced from that may be used as, for example, a step and/or a seat. For example, the cargo platform, in the closed position, may fit within a 10 inch by 10 inch by 50 inch volume. In some examples described below, the cargo platform has a three-panel floor. The three panels are rotatably connected such that, when the cargo platform transitions from the open position to the closed position, the floor rolls up upon itself so that one end wall of the cargo platform is positioned proximate the opposite end wall. In some examples, when in the closed position, a shank that interfaces between the cargo platform and the hitching system of a vehicle may fit within a space defined by the floor panels for storage. Flexible and elastic latches (e.g., made of rubber) may be used to secure the cargo platform in the closed position. In some examples, the frame and flooring of the cargo platform may be made of aluminum. As an additional example, the floor panels may be made of extruded aluminum. The cargo platforms described below may be lighter and/or more compact than other traditional cargo platforms.

Figure 1B:
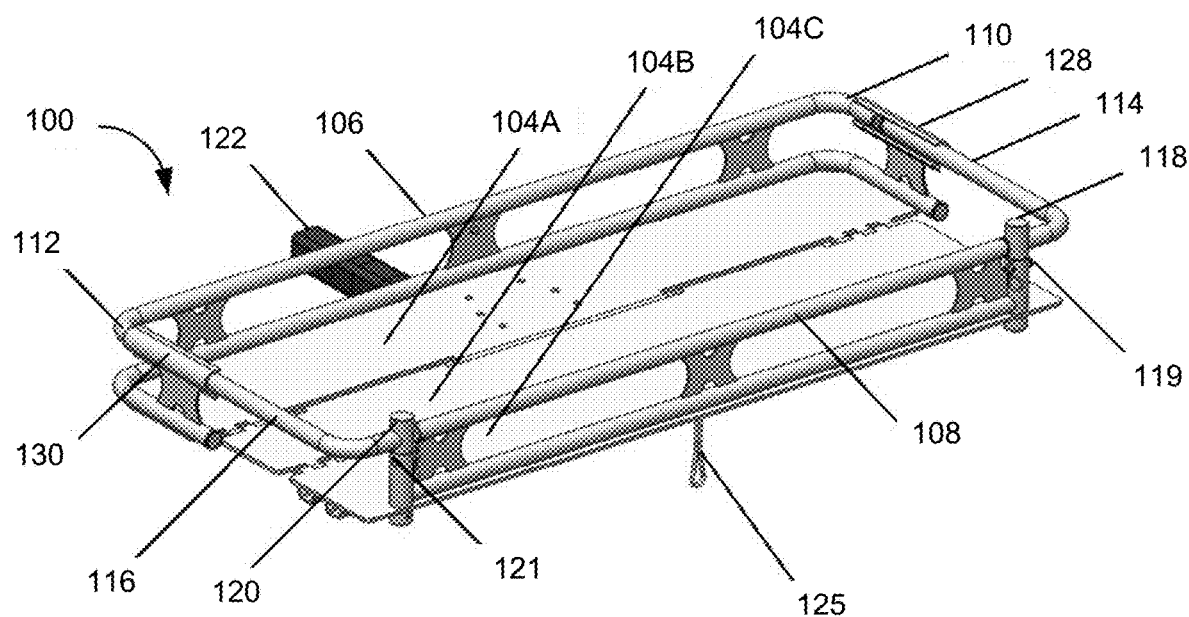

FIGS. 1A and 1B illustrate perspectives view of a cargo platform 100, according to the teachings of this disclosure. In the illustrate example, the cargo platform 100 includes a frame 102 and a foldable floor 104. In the examples illustrated in FIGS. 1A and 1B, the foldable floor 104 includes three floor portions: frame floor 104a, center floor 104b and gate floor 104c. Alternatively, in some examples, the foldable floor 104 may include more than three floor portions. The frame 102 of cargo platform 100 comprises a front portion 106, a rear portion 108, left and right stationary side portions 110 and 112, respectively, and left rotatable and right rotatable side portions 114 and 116, respectively. In some examples, front portion 106 is fixed relative to the rear portion 108 and does not move when the cargo platform 100 transitions between an open position and a closed position (sometimes referred to as a "collapsed position"). The frame 102 or at least one of the components thereof may comprise a tubular member that may be formed from any appropriate material, including, without limitation aluminum, non-metal composite materials, plastic or the like, which may help reduce the overall weight of the cargo platform 100. Alternatively, in some examples, the front portion 106 may move toward rear portion 108 when the cargo platform 100 transitions between the open position and the closed position. Alternatively, in some examples, the rear portion 108 may be fixed to and does not move with respect to gate floor 104c. Alternatively, in some examples, the rear portion 108 may not be fixed to gate floor 104c. In some examples, the front portion 106 may be fixed to and does not move with respect to gate floor 104a.

In the illustrate example of FIGS. 1A and 1B, the cargo platform 100 is configured to mount onto a shank 122. The shank 122 is configured to fit a trailer hitch coupler on a vehicle. The shank 122 may be selectively attached with the cargo platform 100 by, for example, utilizing fasteners (e.g., bolts and/or clamps, etc.). This facilitates the shank 122 being configured for the vehicle and/or being removed from the vehicle when the cargo platform 100 is not in use. The frame 102 comprising tubular members may provide the cargo platform 100 with a lighter design that helps prevent the end away from the shank 122 from rotating in a downward direction toward the ground when installed on a vehicle. This is especially true when the cargo plate 100 is loaded with cargo.

The cargo platform 100 has at least one latching knob 124. In operation, a latching chord loops 125 around or otherwise connects with latching knob 124 to secure cargo platform 100 in the closed position. In the illustrated examples, the latching knob 124 is shown on front frame portion 106. Alternatively or additionally, in some examples, the latching knob 124 may be located on other surfaces suitable for securing the cargo platform 100 in the closed position. For example, the latching knob 124 could be positioned on either or both of the side portions 110 and 112 and/or either or both of the front and rear portions 106 and 108.

Figure 2A:
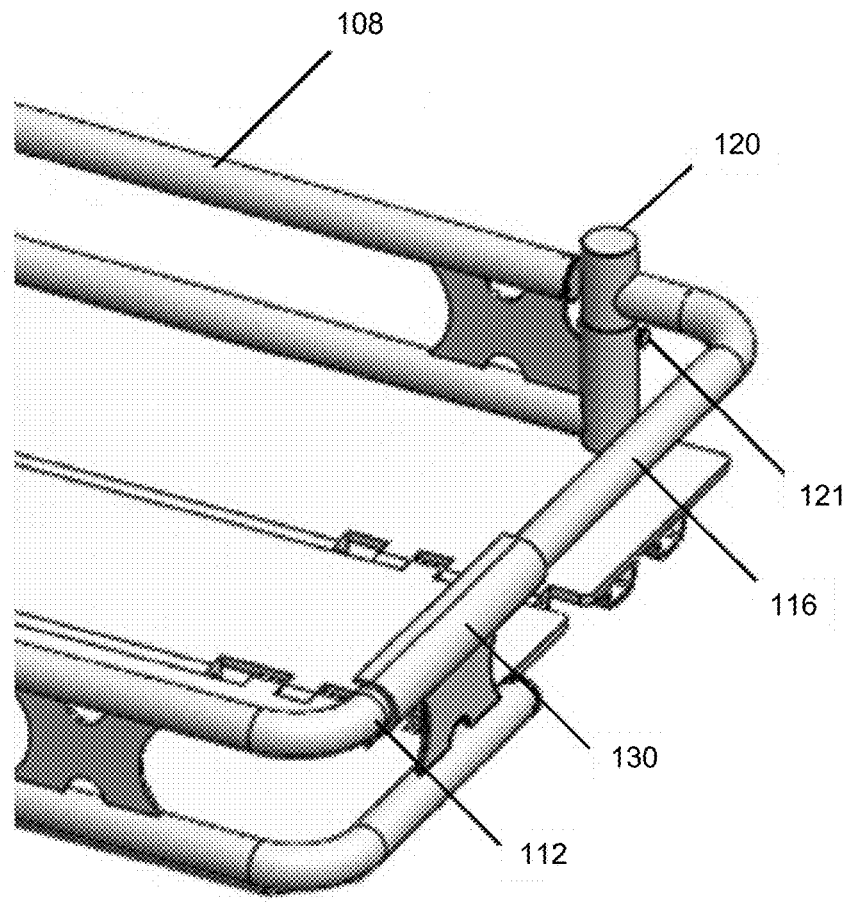
FIGS. 2A, 2B, and 2C illustrate a close up view of a folding apparatus of the cargo platform of FIGS. 1A and 1B in the open position, according to the teachings of this disclosure.
Figure 2B:
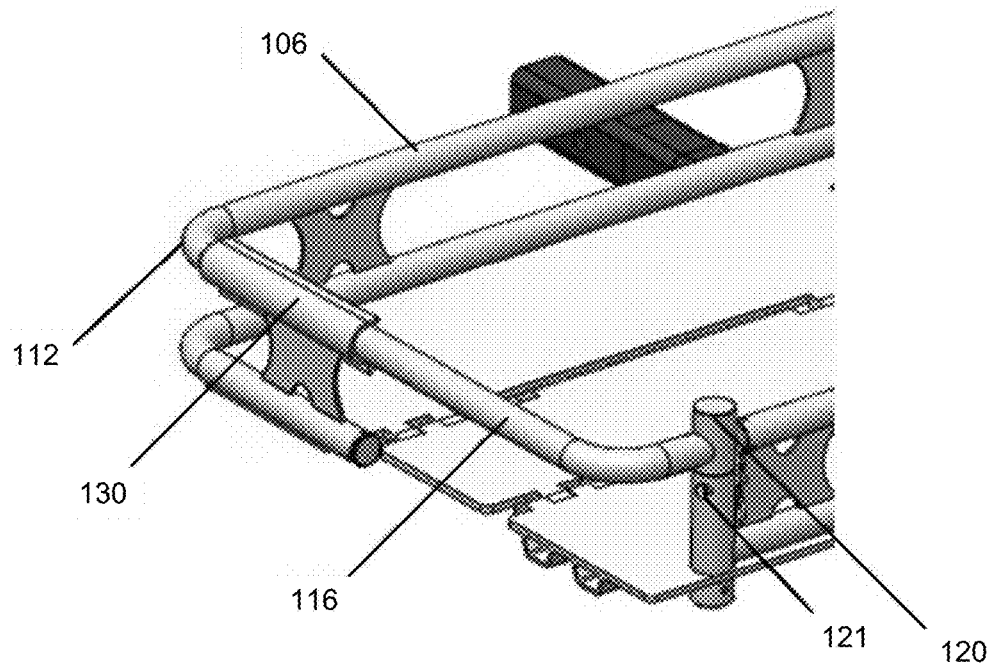
Figure 2C:
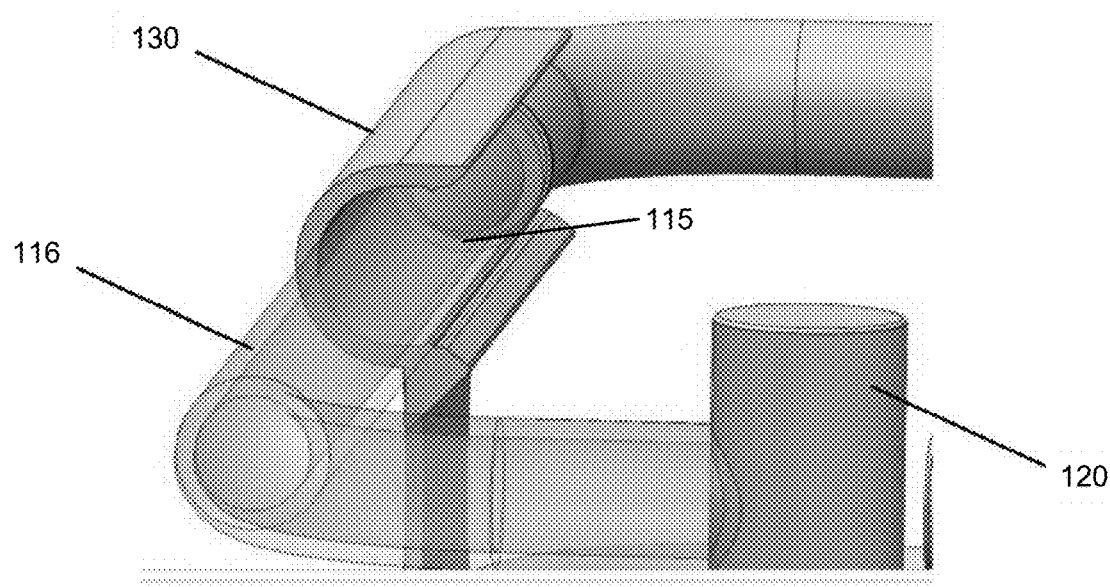
Figure 2D:
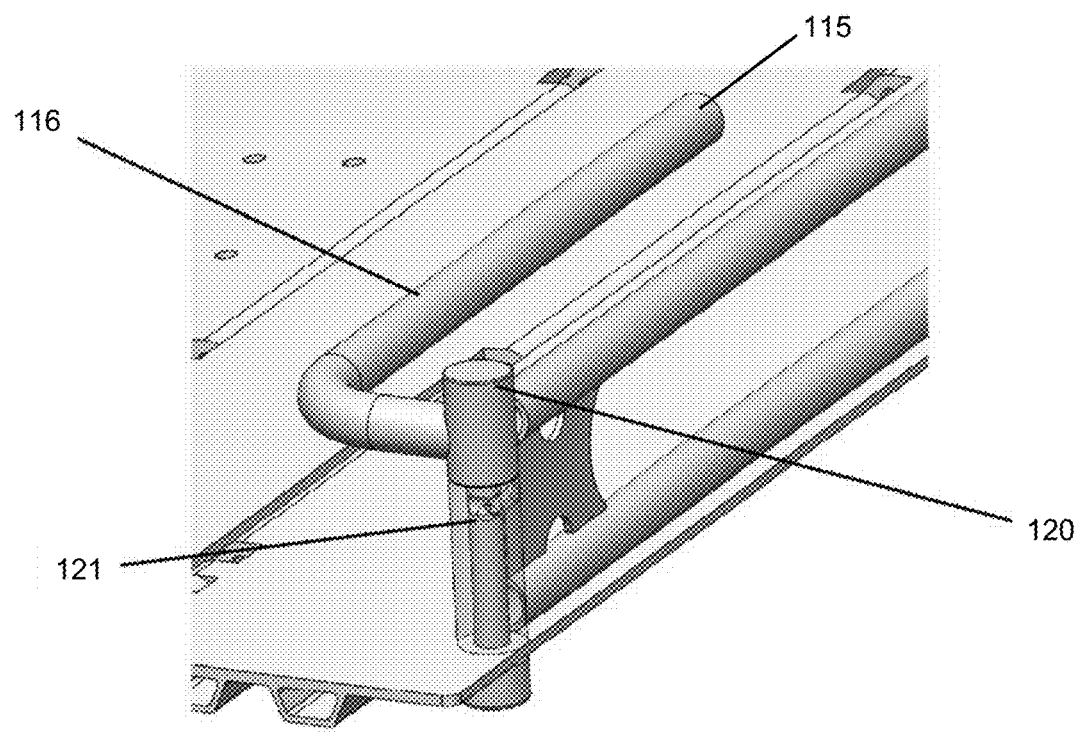
FIG. 2D illustrates a close up view a folding apparatus of the cargo platform of FIGS. 1A and 1B in the folded position, according to the teachings of this disclosure.

Turning to FIGS. 2A, 2B, 2C and 2D, in connection with the collapsibility of the cargo platform 100, left rotatable and right rotatable side portions 114 and 116, respectively, have left and right hinge elements 118 and 120, respectively. The hinge elements 118 and 120 facilitate the left rotatable and right rotatable side portions 114 and 116 to fold inwards toward the front portion 106 of frame 102 when cargo platform 100 is in a closed or a partially closed position. Alternatively or additionally, in some examples, the left rotatable and right rotatable side portions 114 and 116 may fold inwards toward the rear portion 108 of frame 102 when cargo platform 100 is in the closed or the partially closed position. The hinge elements 118 and 120 may be welded, monolithically formed, or otherwise immovably connected, to the left rotatable and right rotatable side portions 114 and 116, respectively. In the illustrated examples, each of the hinges element 118 and 120 also includes a Clevis Pin 119 and 121, respectively, to lock the left rotatable and right rotatable side portions in an open or folded position. As shown in FIG. 2C, the left and right stationary side portions 110 and 112 each terminate in snap connectors 128 and 130. The snap connectors 128 and 130 are shaped to releasably accept and secure via a friction fit, distal ends 115 and 117 of the left rotatable and right rotatable side portions 114 and 116, respectively, when cargo platform 100 is in the open position. In some examples, the snap connectors 128 and 130 are relatively "C" shaped or arcuate shaped. As shown in FIG. 2D, to transition to the folded position, the distal ends 115 and 117 are each removed from their respective snap connectors 128 and 130, to allow the left rotatable and right rotatable side portions 114 and 116 to be rotated in towards the rear frame portion 108 (or, alternatively, towards the front frame portion 106).

Figure 3:
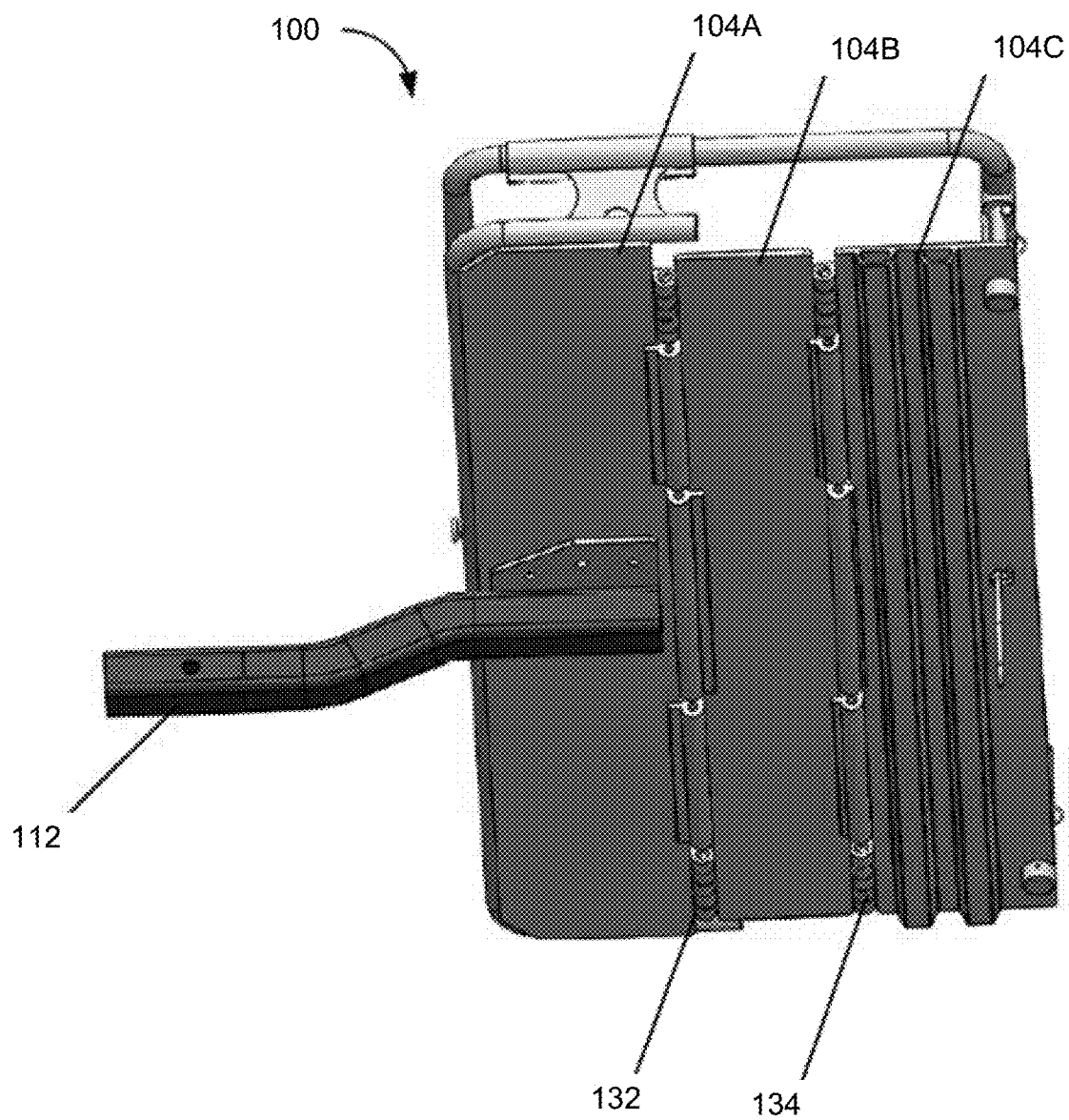
FIG. 3 illustrates a bottom view of the cargo platform of FIGS. 1A and 1B, according to the teachings of this disclosure.
Figure 4A:
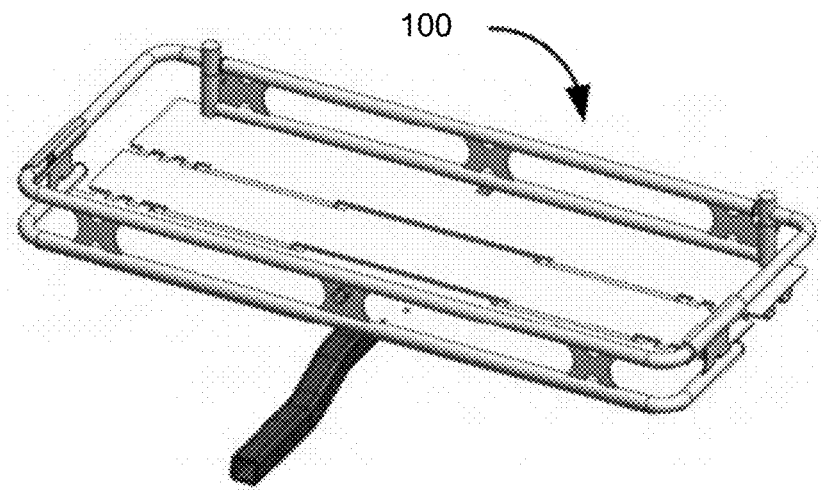
FIG. 4A, 4B, 4C, and 4D illustrate the cargo platform of FIGS. 1A and 1B progressing from an open state to a folded state, according to the teachings of this disclosure.
Figure 4B:
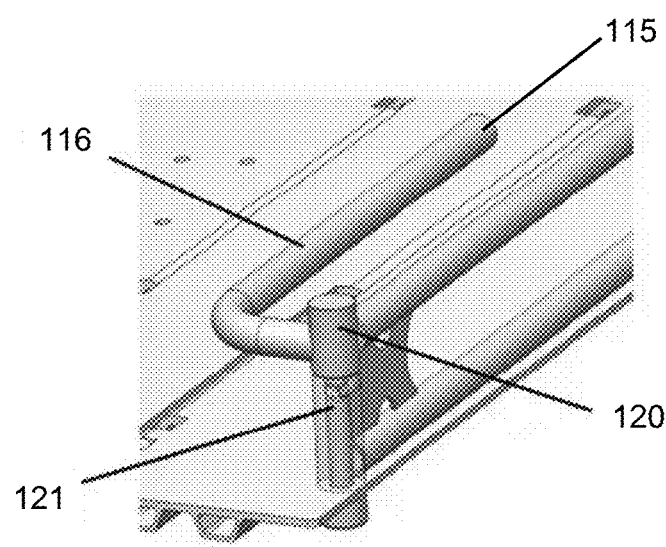
Figure 4C:
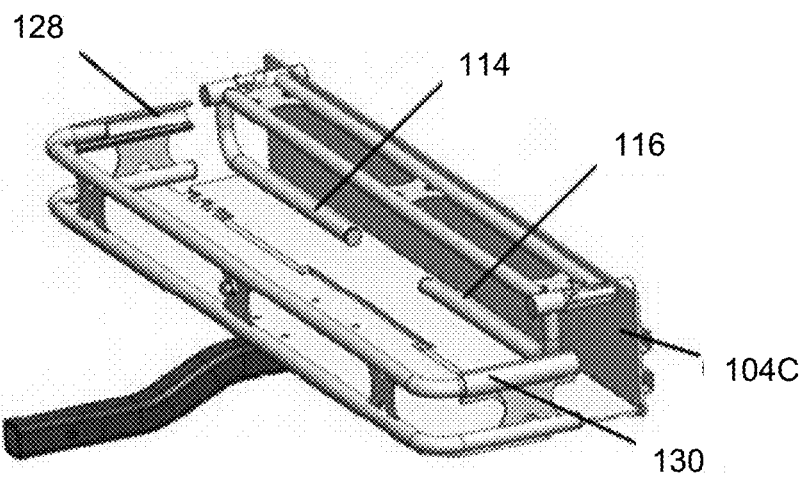

As illustrated in FIG. 3, the frame floor 104a and the center floor 104b are rotatably connected via an interconnecting portion 132. The gate floor 104c and center floor 104b are rotatably connected via an interconnecting portion 134. In some examples, each of the interconnecting portions 632 and 634 are configured to permit a maximum open rotational position of 180 degrees with respect to adjacent floor portions, when cargo platform 100 is in a fully open state (see FIG. 4A below). In some examples, each of the interconnecting portions 132 and 134 are designed to permit a maximum closed rotational position of 90 degrees with respect to adjacent floor portions, when cargo platform 100 is in a fully closed state (see FIG. 4D below). The interconnecting portions 632 and 634 may be hinges or any other mechanism for rotatably connecting adjacent floor portions.

Figure 4D:
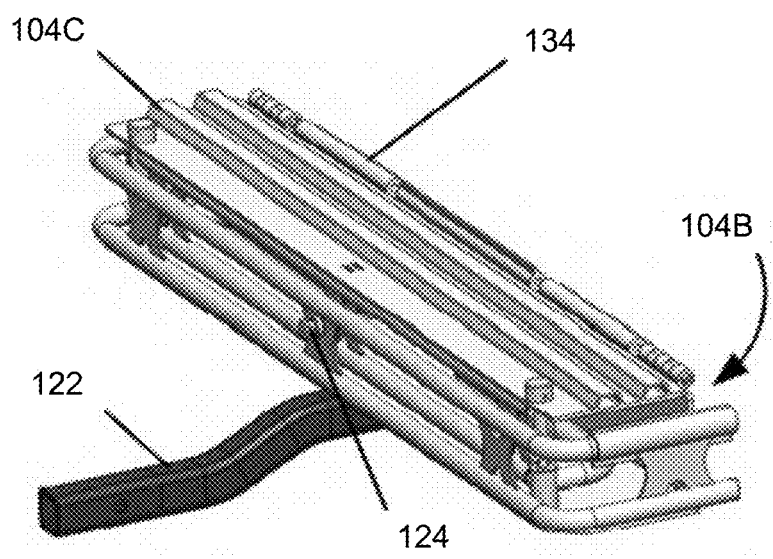

FIGS. 4A, 4B, 4C and 4D illustrate, in a step-wise fashion, transitioning the cargo platform 100 from a fully open position (FIG. 4A) to a fully closed position (FIG. 4D). In the example illustrated in FIG. 4B, in a first transition step, (i) the Clevis Pins 119 and 121 are unlocked to allow the hinge elements 118 and 120 to rotate, (ii) the distal ends 115 and 117 are unsecured from their respective snap connectors 128 and 130, and (iii) the left rotatable and right rotatable side portions 114 and 116 are rotated in towards the front frame portion 106. In the example illustrated in FIG. 4C, in a second transition step, the gate floor 104c is rotated 90 degrees inwards towards center floor 104b. In the example illustrated in FIG. 4D, in a third transition step, the center floor 104b is rotated 90 degrees inwards towards frame floor 104a. In the fully closed state shown in FIG. 4D, the cargo platform 100 may be secured in this position by connecting a latching cord 125 to the latching knob 124. Additionally, in some examples, the cargo platform 100, when in the fully closed position shown in FIG. 4D, may be used as a step or a seat. When the shank 122 is operatively installed into a hitch receiver of the vehicle the cargo platform 100 can act as a step for a user to step on get into the vehicle or access a higher point on the vehicle. It may also act as a seat for a user to sit on when in the collapsed position. When in the open position and attached to the vehicle, the cargo platform 100 can act as a storage basket on which items can be attached so as to be transported.

Figure 5A:
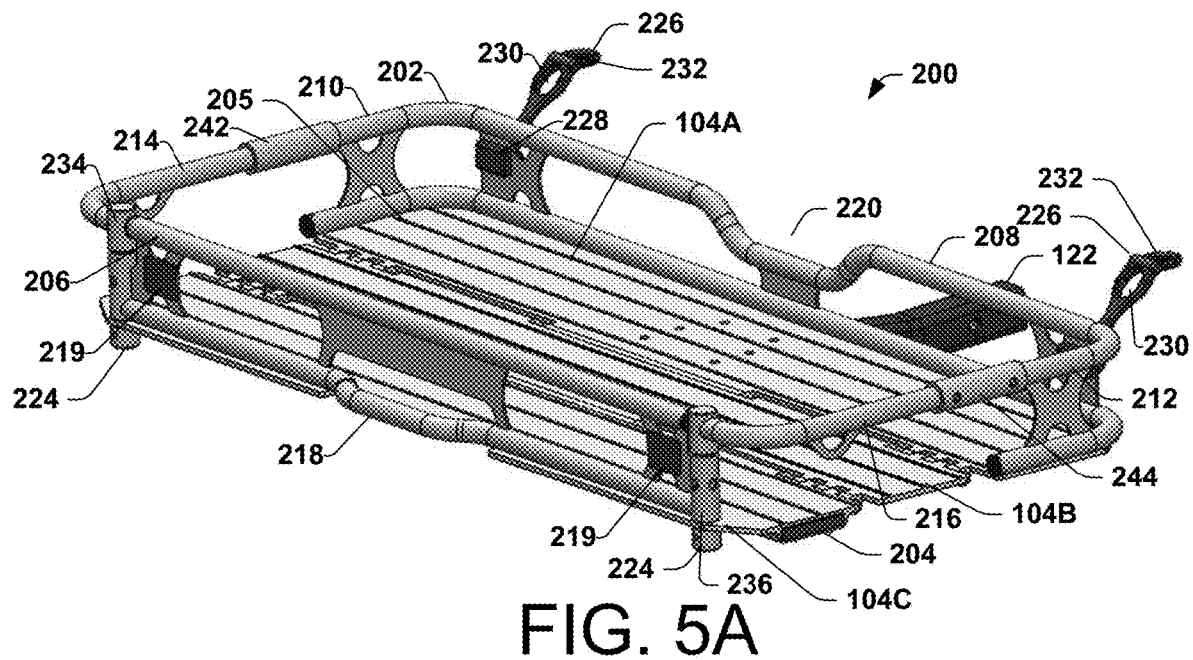
FIG. 5A illustrates a perspectives view of a cargo platform in an open position, according to the teachings of this disclosure.
Figure 5B:
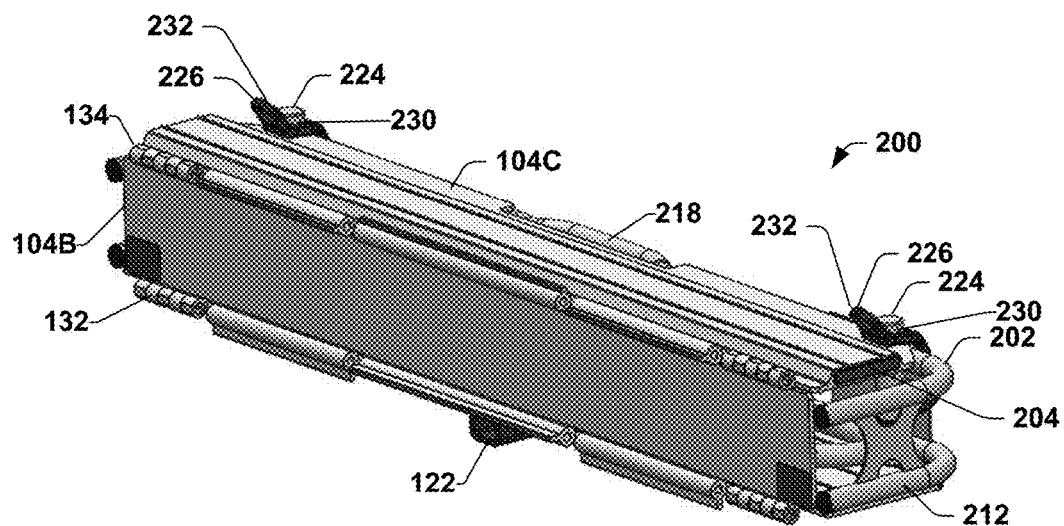
FIGS. 5B and 5C illustrate a perspectives view of a cargo platform in a folded position, according to the teachings of this disclosure.
Figure 5C:
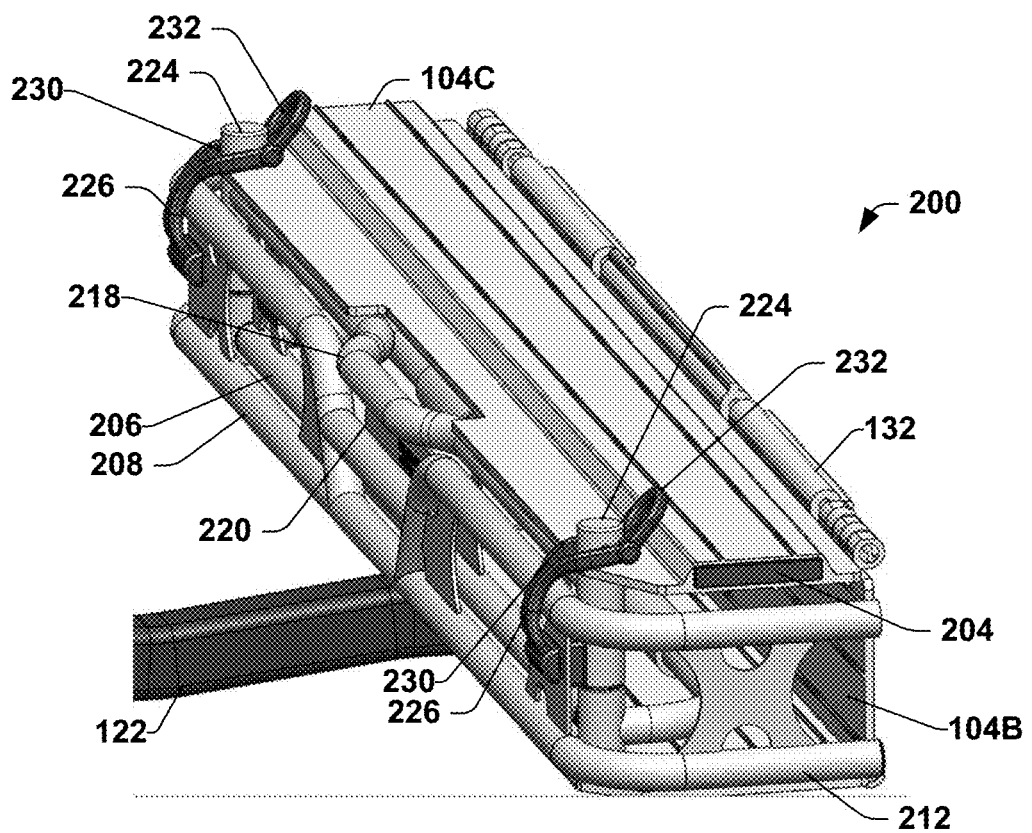

FIGS. 5A, 5B, and 5C illustrate an example cargo platform 200 that includes a frame 202 and the foldable floor 104. In the examples illustrated in FIGS. 5A, 5B, and 5C, the foldable floor 104 includes three floor portions: frame floor 104a, center floor 104b and gate floor 104c. Alternatively, in some examples, the foldable floor 104 may include more than three floor portions. In the illustrated example, the gate floor 104c incorporates reflectors 204 on each end of the gate floor 104c. The frame floor 104a, center floor 104b and gate floor 104c may be formed of an extruded aluminum with grip ridges 205 to provide a gripping surface on a top side of the frame floor 104a, center floor 104b and gate floor 104c. As described in FIGS. 3, 4A, 4B, 4C, and 4D above, the frame floor 104a and the center floor 104b are rotatably connected via an interconnecting portion 132 and the gate floor 104c and center floor 104b are rotatably connected via an interconnecting portion 134. In some embodiments, any one of, some of or all of the frame floor 104a, center floor 104b and gate floor 104c may include devices that help secure various accessories. This may comprise a strap for a bicycle wheel, a dedicated strap or plurality of straps to which a cargo bag may be selectively attached, a ski holder or plurality of ski holders, etc. The present disclosure isn't limited to just these embodiments but may comprise any accessory attachment device or mechanism.

The frame 202 of cargo platform 200 includes a front portion 206, a rear portion 208, left and right stationary side portions 210 and 212, respectively, and left rotatable and right rotatable side portions 214 and 216, respectively. In the illustrated example, the front portion 206 includes a handle 218 to facilitated transitioning the cargo platform 200 from the open position (FIG. 5A) to the closed position (FIGS. 5B and 5C). The front portion 206 also includes reflectors 219 to promote visibility of the cargo platform 200 when the cargo platform 200 is in the open position.

The rear portion 208 defines a clearance 220 configured to receive the handle 218 when the cargo platform 200 is in the closed position. The frame 202 or at least one of the components thereof may comprise a tubular member that may be formed from any appropriate material, including, without limitation aluminum, non-metal composite materials, plastic or the like, which may help reduce the overall weight of the cargo platform 200. Further, any, some or all of the front portion 206, rear portion 208, left and right stationary side portions 210 and 212 may also include a portion of or an accessory attachment device. By way of a non-limiting example, the left and right stationary side portions 210 and 212 may include a bicycle attachment device such as a forked mechanism to which the front wheel or more specifically the front wheel nut may attach. The frame floor 104a, center floor 104b and gate floor 104c may include a correspondingly aligned strap that attaches to the rear wheel of the bike such that the cargo platform 200 may be used as a bicycle carrier.

In the illustrate example of FIGS. 5A, 5B, and 5C, the cargo platform 200 is configured to mount onto the shank 122. The shank 122 is configured to fit a trailer hitch coupler on a vehicle. The shank 122 may be selectively attached with the cargo platform 200 by, for example, utilizing fasteners (e.g., bolts and/or clamps, etc.). This facilitates the shank 122 being configured for the vehicle and/or being removed from the vehicle when the cargo platform 200 is not in use.

In the illustrated examples, the cargo platform 200 includes two latching knobs 224. In operation, a two corresponding latches 226 are configured to fit around the latching knobs 224 to secure cargo platform 200 in the closed position. The latches 226 are made of a flexible and/or or stretchable material to facilitate a tight connection with the latching knobs 224, such as plastic or rubber. The latches 226 include a base portion 228 and define a latching aperture 230 and a handle aperture 232. The rear portion 208 defines a latch hole for each of the latches 226 that is smaller than the base portion 228. In the illustrated example, the base portion 228 of the latch 226 is press fit into the latch hole to provide a secure connection between the rear portion 208 and the latch 226. As illustrated in FIGS. 5B and 5C, when the cargo platform 200 is in the closed position, the latching knob 224 fits into the latching aperture 230 of the latch 226. In some examples, the latching aperture 230 is sized to provide a friction fit with the latching knob 224. In the position shown in FIG. 5C, the cargo platform 200 may act as a step or a seat. The gate floor 104*c* may include a groove or a plurality of grooves (e.g., 2, 3, 4 or more) that can provide a stepping surface with traction. The grooves may provide traction for a user. Moreover, the floor 104*c* could comprise a seating surface such that a softer material could be added to act like a seat for a user.

Figure 6A:
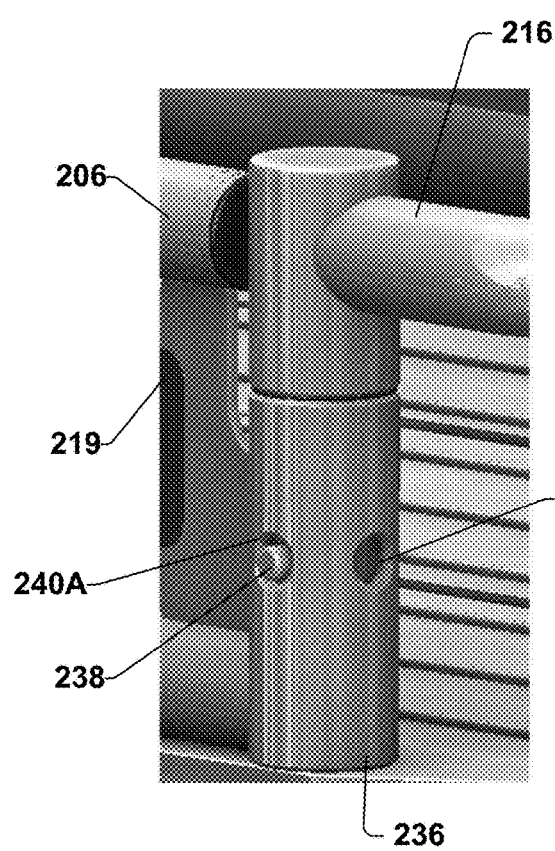
FIGS. 6A and 6B illustrate close up views of a folding apparatus of the cargo platform of FIGS. 5A, 5B, and 5C, according to the teachings of this disclosure.
Figure 6B:
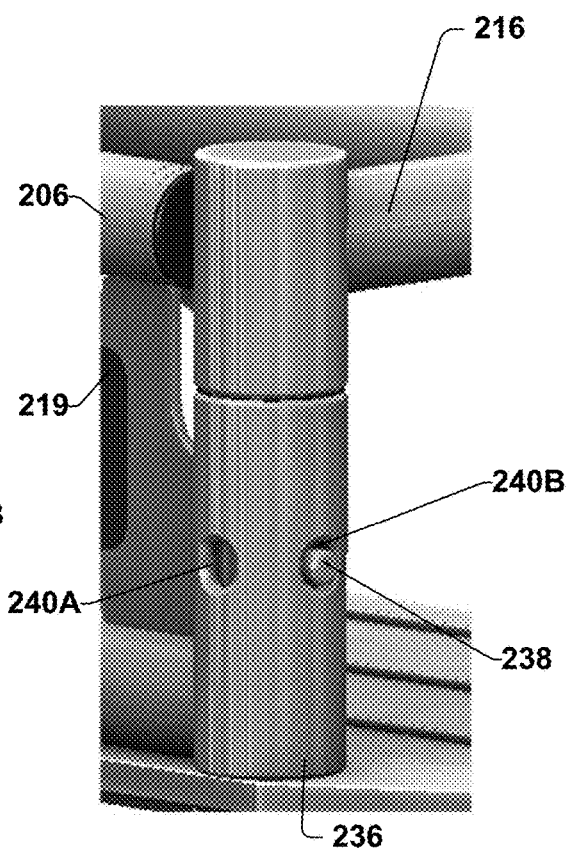

As shown in FIGS. 6A and 6B, in connection with the collapsibility of the cargo platform 200, left rotatable and right rotatable side portions 214 and 216, respectively, have left and right hinge elements 234 and 236, respectively. The hinge elements 234 and 236 facilitate the left rotatable and right rotatable side portions 214 and 216 to fold inwards toward the front portion 206 of frame 202 when cargo platform 200 is in a closed or a partially closed position. In the illustrated examples, each of the hinges elements 234 and 236 include a push button spring pin 238 and define two pin lock apertures 240A and 240B (collectively "pin lock aperture 240") to lock the left rotatable and right rotatable side portions in an open position (FIG. 6A) or folded position (FIG. 6B). To transition the hinges elements 234 and 236 from one position to the other, the push button spring pin 238 is pressed until it clears the current pin lock aperture 240, the hinge element 234 and 236 rotates such that the push button spring pin 238 snaps into the other pin lock aperture 240. Alternatively, in some examples, a Clevis pin or other locking mechanism may be used to control rotation of the hinges elements 234 and 236.

Figure 7A:
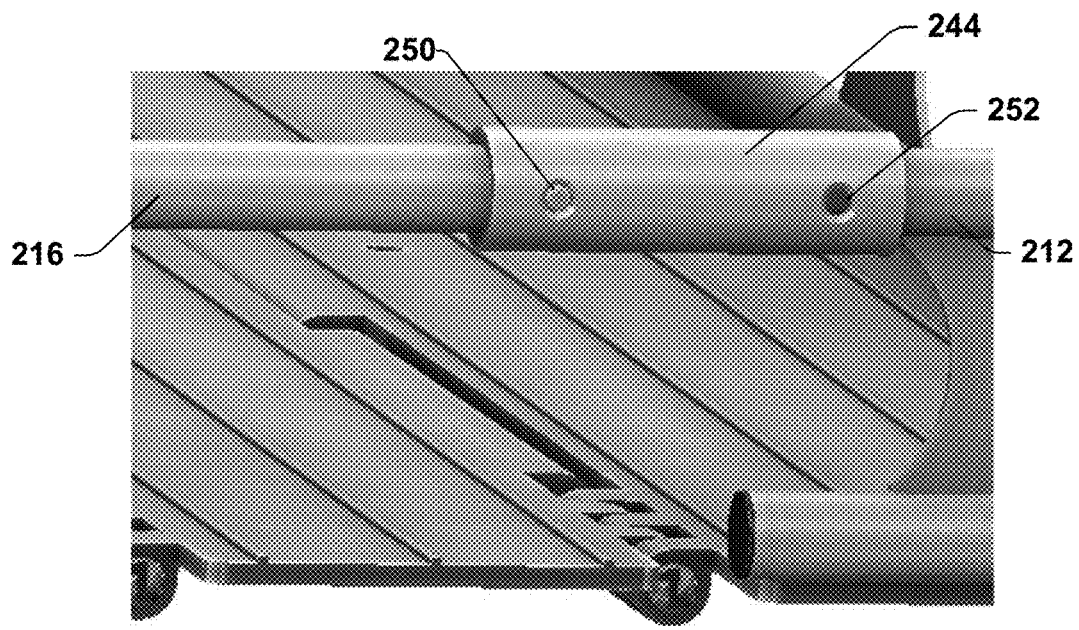
FIGS. 7A and 7B illustrate close up views of a locking mechanism of the folding apparatus of the cargo platform of FIGS. 5A, 5B, and 5C, according to the teachings of this disclosure.
Figure 7B:
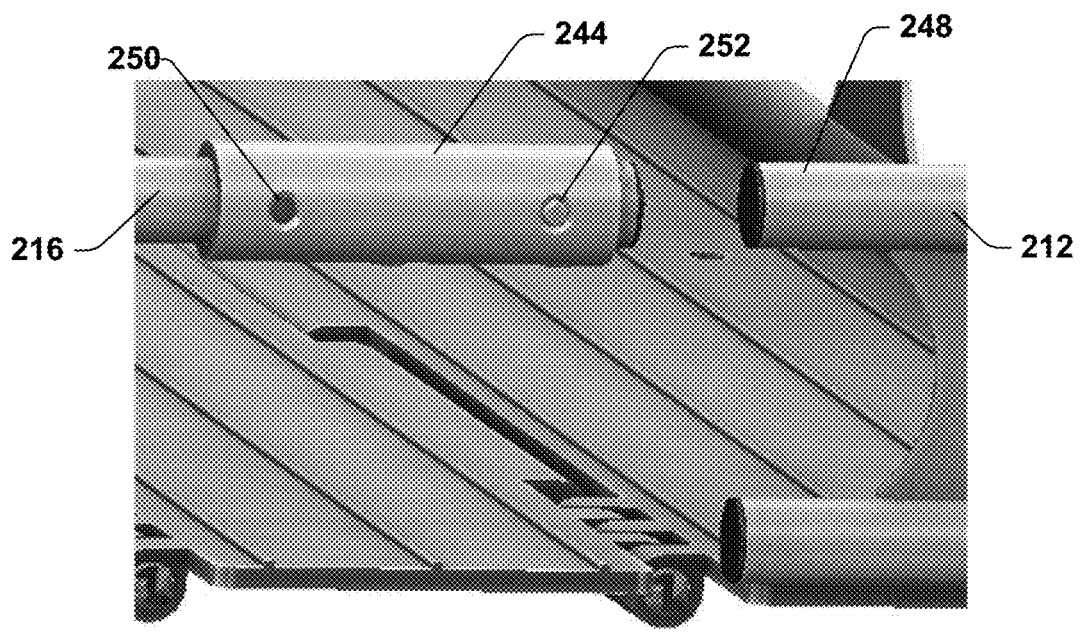

As shown in FIGS. 7A and 7B, the left and right stationary side portions 210 and 212 each terminate in sleeve connectors 242 and 244. The sleeve connectors 242 and 244 releasably accept and secure distal ends 246 and 248 of the left stationary and right stationary side portions 210 and 212, respectively. As illustrated in FIG. 7A, when the cargo platform 200 is in open position, the sleeve connectors 242 and 244 slidably engage from the distal ends 246 and snap into an open locking aperture 250 As illustrated in FIG. 7B, when the cargo platform 200 is in or transitioning to the closed position, the sleeve connectors 242 and 244 slidably disengage from the distal ends 246 and 238 of the left rotatable and right rotatable side portions 214 and 216 and snap into an closed locking aperture 252.

Figure 8:
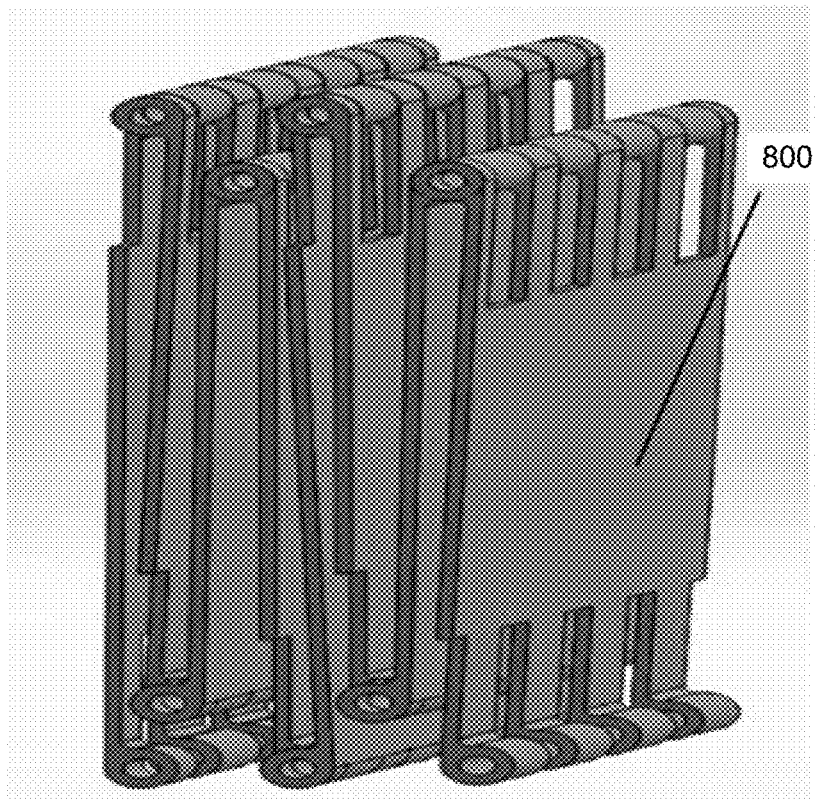
FIG. 8 illustrates an example foldable floor for the cargo platforms, according to the teachings of this disclosure.
Figure 9:
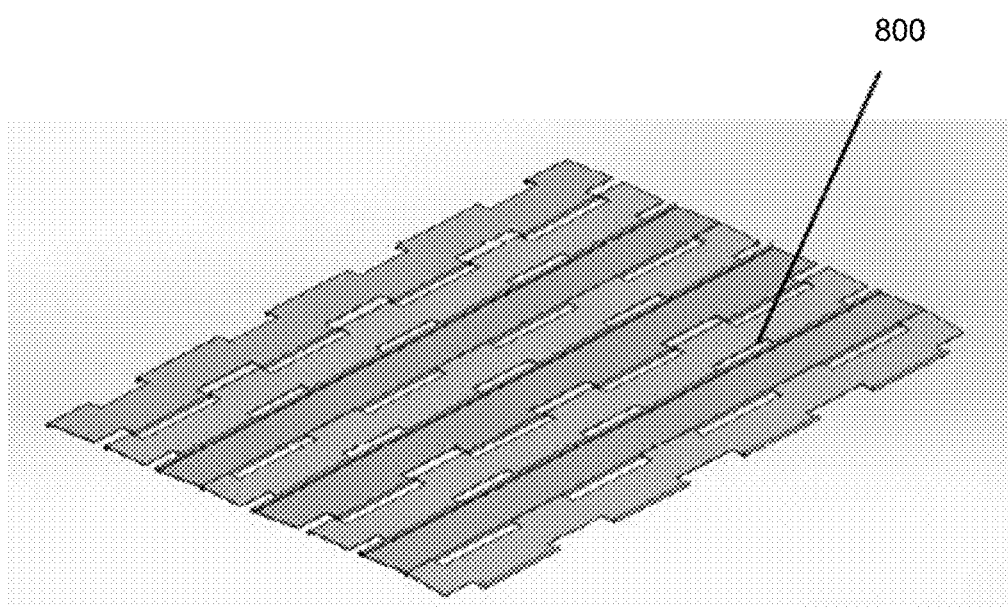
FIG. 9 illustrates another example foldable floor the cargo platforms, according to the teachings of this disclosure.

Turning to FIGS. 8 and 9, FIG. 8 illustrates an example foldable floor 800 in the closed position that may be used in with any of the cargo platforms disclosed herein. FIG. 9 illustrates the example foldable floor 800 in the open position. For examples, instead of rolling up like the fool 104 illustrated above, the foldable floor 800 accordions or telescopes as the front portion moves laterally towards the back portion of the cargo platform.

Figure 10:
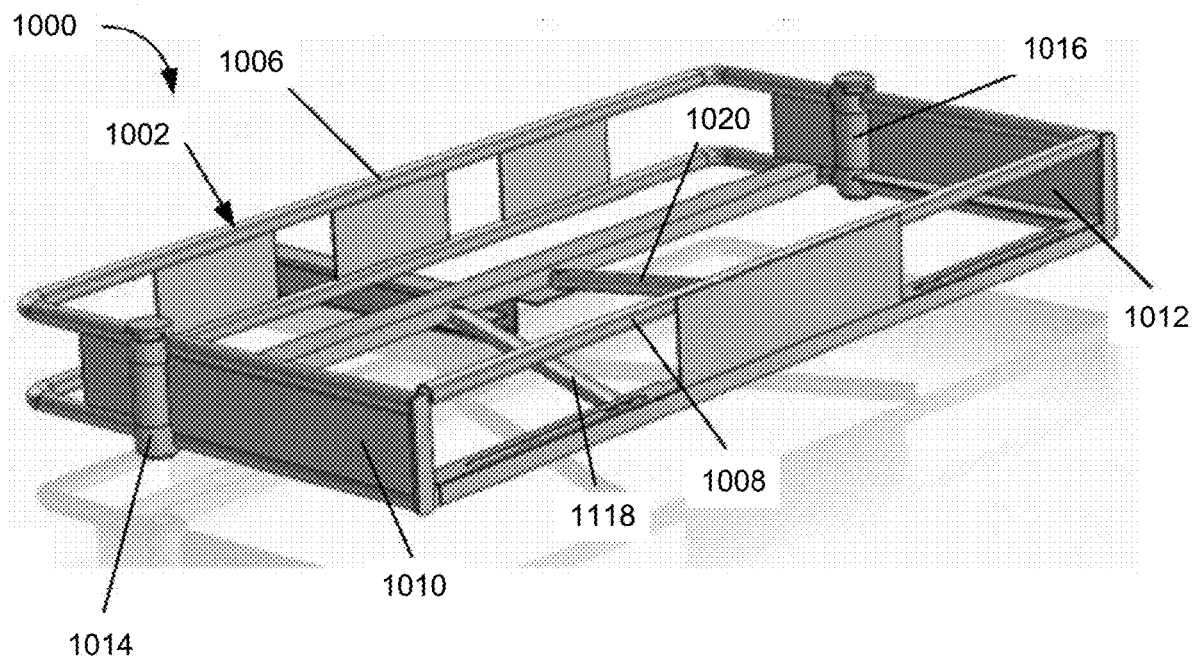
FIGS. 10 and 11 illustrate a cargo platform, according to the teachings of this disclosure.
Figure 11:
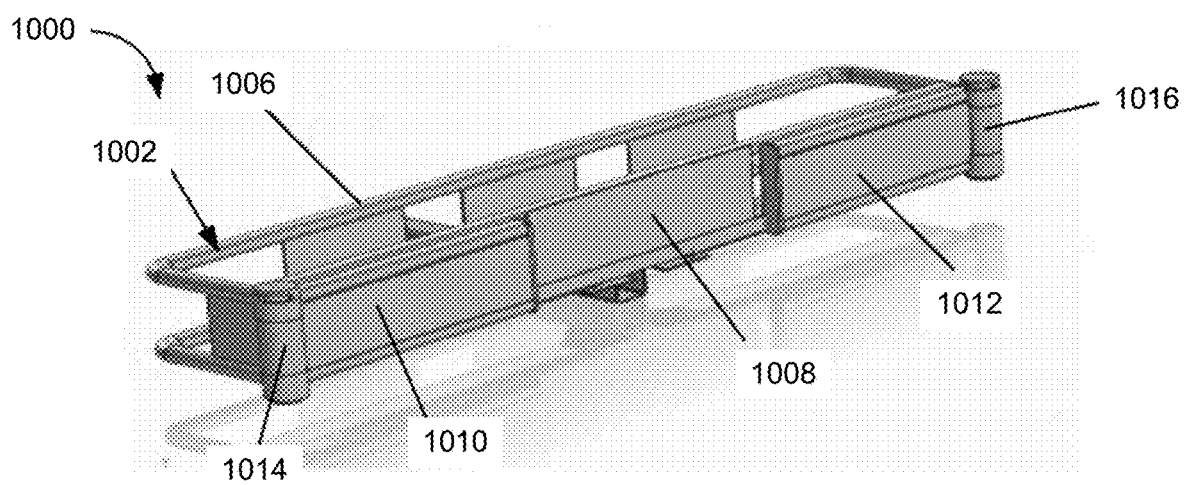

FIGS. 10 and 11 illustrate an example cargo platform 1000. FIG. 10 illustrates the cargo platform 1000 in an open position. FIG. 11 illustrates the cargo platform 1000 in a closed position. The cargo platform 1000 includes a collapsible frame 1002 and a foldable floor 1004 formed from a plurality of rod-shaped floor members. Additionally, the frame 1002 of the cargo platform 1000 includes a front portion 1006, a rear portion 1008 and left and right side portions 1010 and 1012, respectively. In some examples, the front portion 1006 of the frame 1002 is fixed and does not move, while the rear portion 1008 is configured to move forward towards the front portion 1006 of the frame 1002 so that the cargo platform 1000 can be collapsed when desired. In connection with the collapsibility of cargo platform 1000, the left and right side portions 1010 and 1012, respectively, have left and right hinge elements 1014 and 1016, respectively, that permit at least a portion of left and right side portions 1010 and 1012 to fold over the end of the rear portion 1008 of the frame 1002 when the cargo platform 1000 is in the closed position.

The cargo platform 1000 also includes the support members 1018 and 1020 that are configured to be slidable or telescoping so that the support members 1018 and 1020 can be reduced in length when cargo platform 1000 is in the closed position. The cargo platform 1000 the shank 122 designed to fit a trailer hitch coupler on a vehicle. In some examples, the cargo platform 1000 includes one or more tie down loops 1024. Although the tie down loops 1024 are shown on the rear frame portion 1008, the tie down loops 1024 may be located anywhere else and in any desired number. The tie down loops 1024 may also act as latching loops when cargo platform 1000 is in the closed position. Also, although not illustrated in FIGS. 10 and 11, a license plate adapter may be included with the cargo platform 1000 to permit the mounting of a license plate on the back edge of the cargo platform 1000.

In some examples, the tie down loops 1024 may be spring loaded so as to facilitate a locking mechanism for the sides of the cargo platform 1000 when the cargo platform 1000 is in the closed position. In such examples, each of the tie down loops 1024 further includes a set of slots 1050 that permit each of the loops 1024 to move in at least one direction (i.e., horizontally and/or vertically) when the cargo platform 1000 is folded. Each of the tie down loops 1024 further includes a spring loaded latching mechanism 1052 and a capture mechanism 1054. In some examples, the spring loaded mechanisms 1054 of the cargo platform 1000 permit safe securing of the arm portions of the sides 1010 and 1012 and the back portion 1008 when in use. FIGS. 16A, 16B, 16C, and 16D are various views (a side view and a cross-view) of the cargo platform 1000 of FIGS. 10 and 11.

Figure 12:
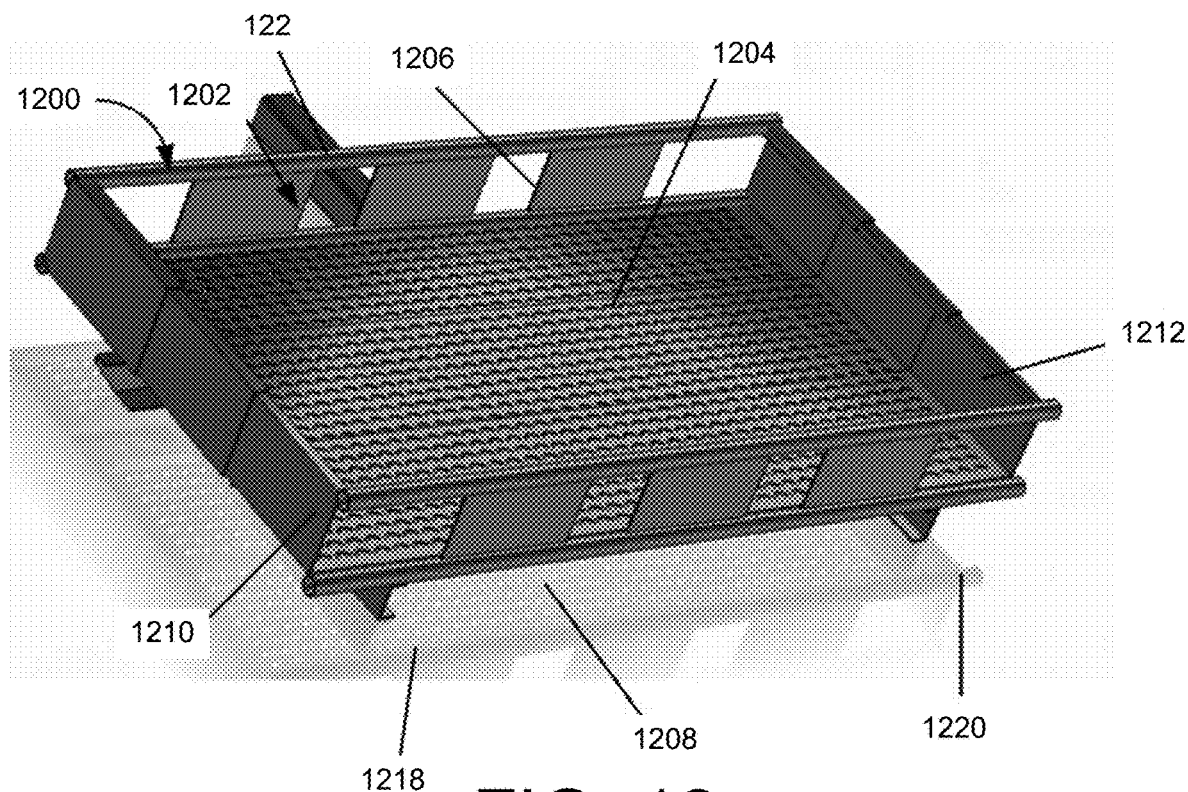
FIGS. 12 and 13 illustrate a collapsible cargo platform, according to the teachings of this disclosure.
Figure 13:
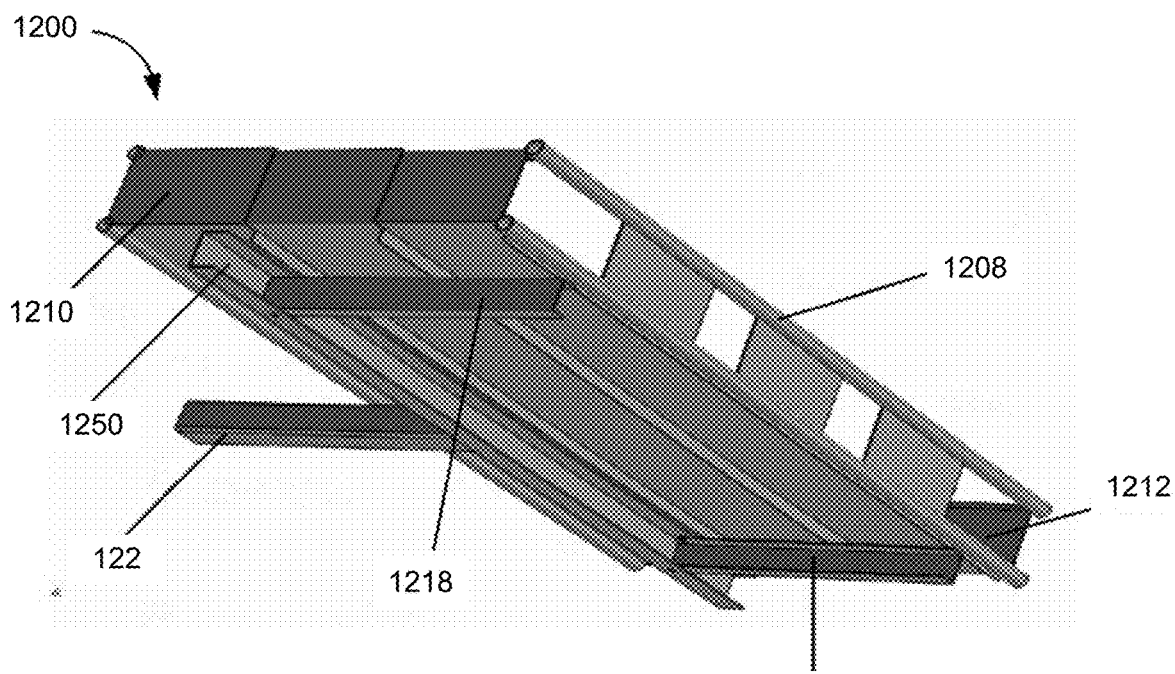

FIGS. 12 and 13 illustrate an example cargo platform 1200. The cargo platform 1200 includes a collapsible frame 1202 and a foldable floor 1204. The collapsible frame 1202 includes a front portion 1206, a rear portion 1208 and left and right side portions 1210 and 1212, respectively, that are able to slide and nest in order to the permit cargo platform 1200 to fold/collapse. In some examples, the front portion 1206 of the frame 1202 is fixed and does not move, while the rear portion 1208 is designed to move forward towards the front portion 1206 of frame 1202 so that the cargo platform 1200 can be collapsed when desired. In connection with the collapsibility of the cargo platform 1200, the left and right side portions 1210 and 1212, respectively, are able to nest via the use of a plurality of nesting elements that form the left and right side portions 1210 and 1212.

Figure 14:
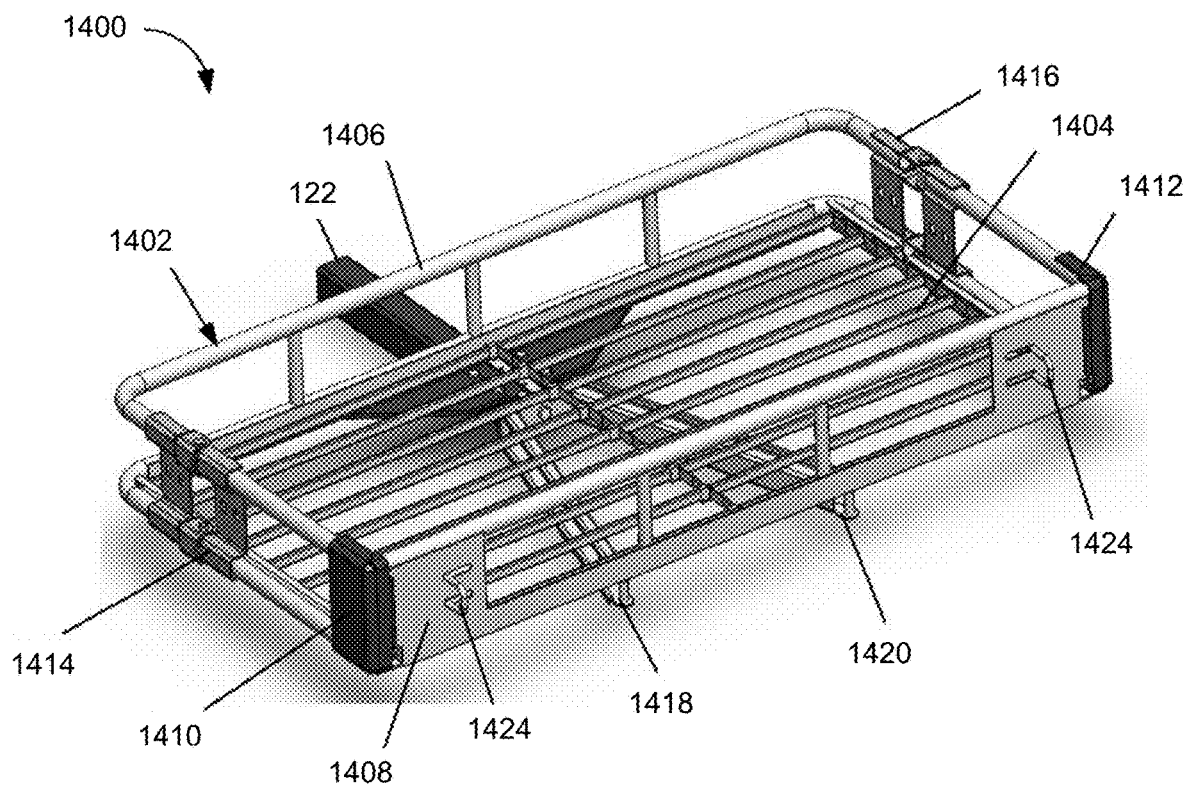
FIGS. 14 and 15 illustrate a cargo platform, according to the teachings of this disclosure.

The cargo platform 1200 includes the support members 1218 and 1220 that are designed to be slidable or telescoping so that the support members 1218 and 1220 can be reduced in length when the cargo platform 1200 is in the closed position. Alternatively, in some examples, the support members 1218 and 1220 may be rotatably connected to an additional support bracket 1250 and configured such that the support members 1218 and 1220 rotatably fit within the additional support bracket 1250. The cargo platform 1200 includes the shank 122 designed to fit a trailer hitch coupler on a vehicle. Turning specifically to FIG. 14, FIG. 13 illustrates the cargo platform 1200 from underneath so that additional support bracket 1250 is shown.

Figure 15:
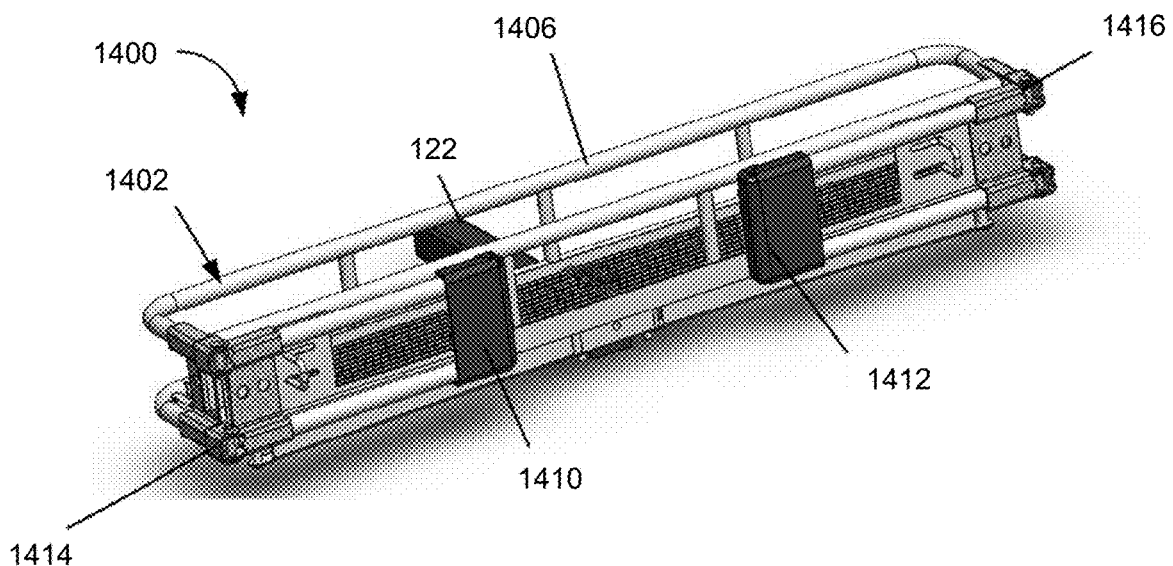
Figure 16B:
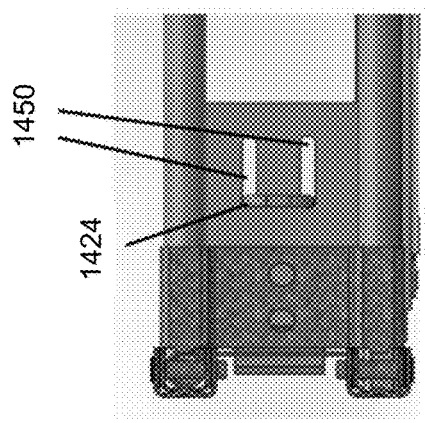
FIGS. 16A, 16B, 16C, and 16D illustrate a latching mechanism for the cargo platform of FIGS. 14 and 15, according to the teachings of this disclosure.
Figure 16D:
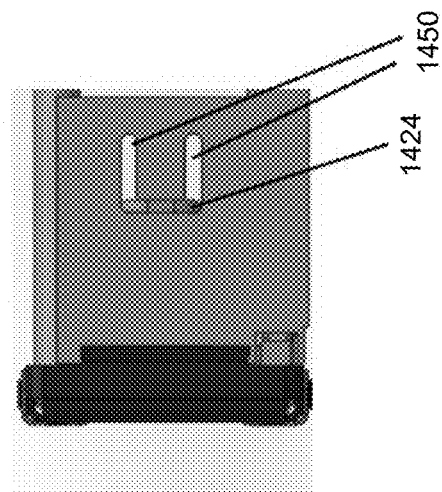
Figure 16A:
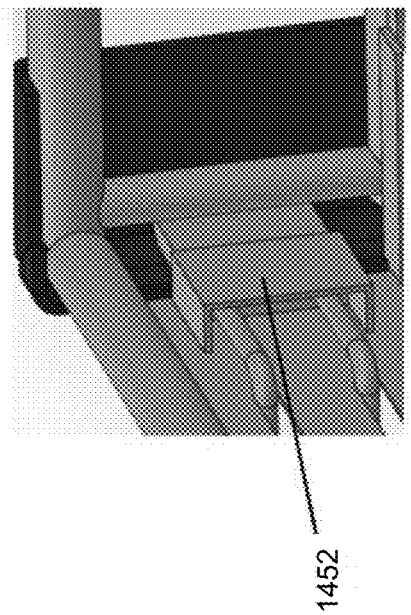
Figure 16C:
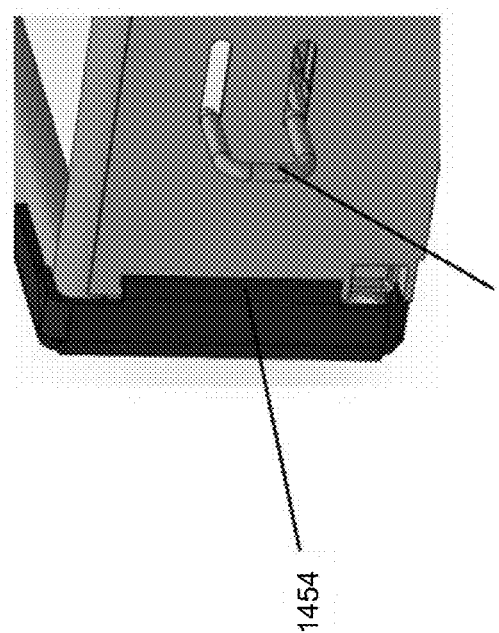
Figure 17:
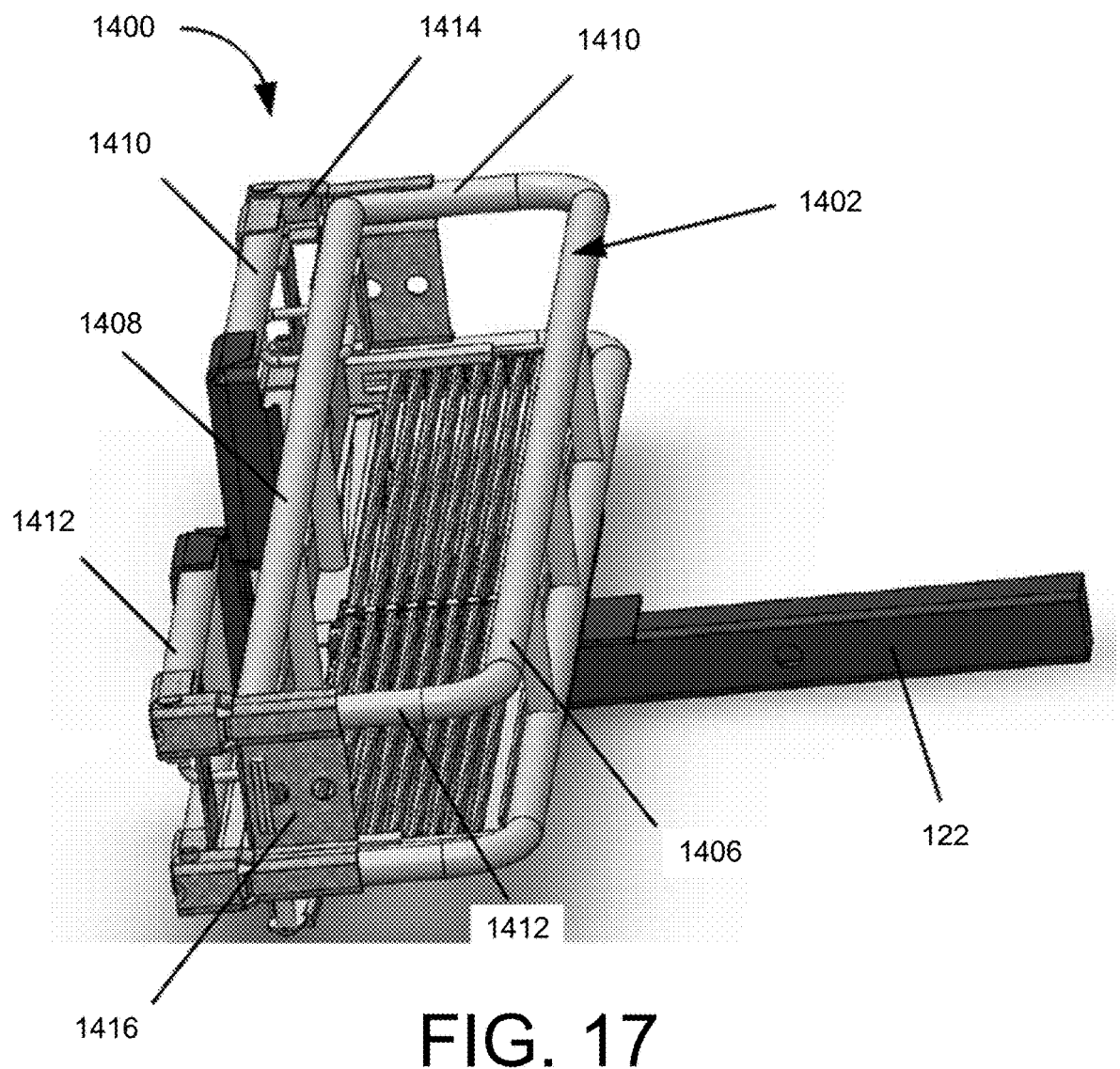
FIGS. 17 and 18 illustrate the cargo platform of FIGS. 14 and 15 mounted on a shank, according to the teachings of this disclosure.
Figure 18:
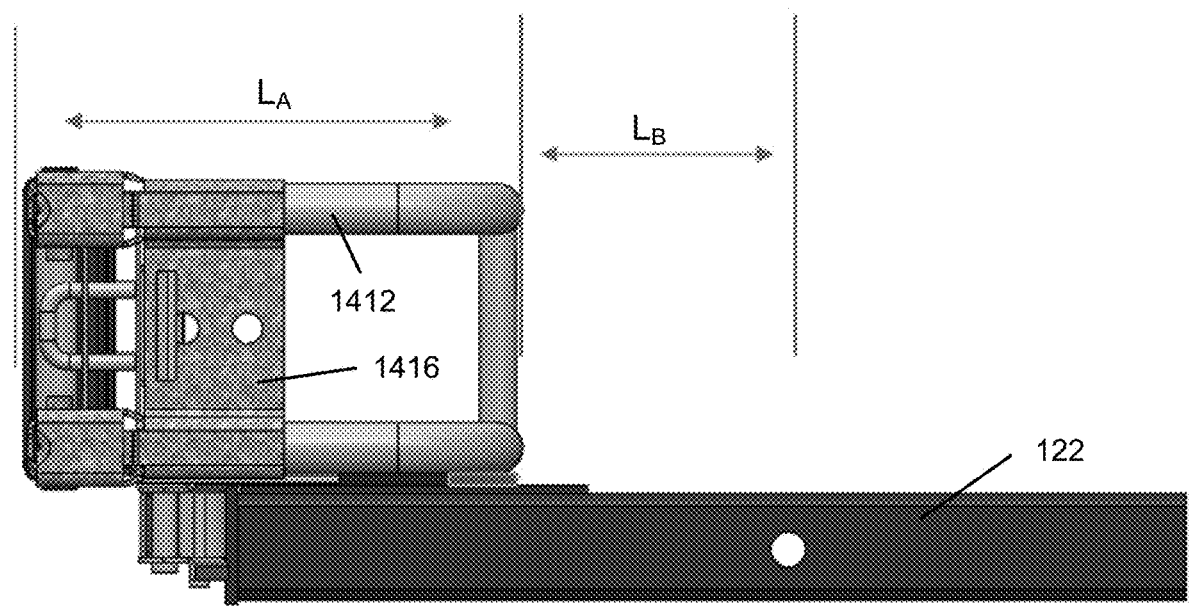

FIGS. 14, 15, 17, and 18 illustrate a cargo platform 1400. FIG. 14 illustrates the cargo platform 1400 in an open position. FIG. 15 illustrates the cargo platform 1400 in a closed position. The cargo platform 1400 includes a collapsible frame 1402 and a foldable floor 1404 formed from a plurality of rod-shaped floor members. The frame 1402 of the cargo platform 1400 includes a front portion 1406, a rear portion 1408 and left and right side portions 1410 and 1412, respectively. In some examples, the front portion 1406 of the frame 1402 is fixed and does not move, while the rear portion 1408 moves forward towards the front portion 1406 of frame 502 so that cargo platform 1400 can be collapsed into the closed position when desired. In connection with the collapsibility of the cargo platform 1400, the left and right side portions 1410 and 1412, respectively, have left and right hinge elements 1414 1416, respectively, that permit at least a portion of the left and right side portions 1410 and 1412 to fold over the end of rear portion 1408 of frame 1402 when cargo platform 1400 is in a collapsed state.

The cargo platform 1400 also includes support members 1418 and 1420 that are designed to be slidable or telescoping so that the support members 1418 and 1420 can be reduced in length when cargo platform 1400 is in the closed position. The cargo platform 1400 may be attached to a shank 122 configured to fit a trailer hitch coupler on a vehicle. In the illustrated example, the cargo platform 1400 includes one or more of the one or more tie down loops 1024 as described above.

Figure 19B:
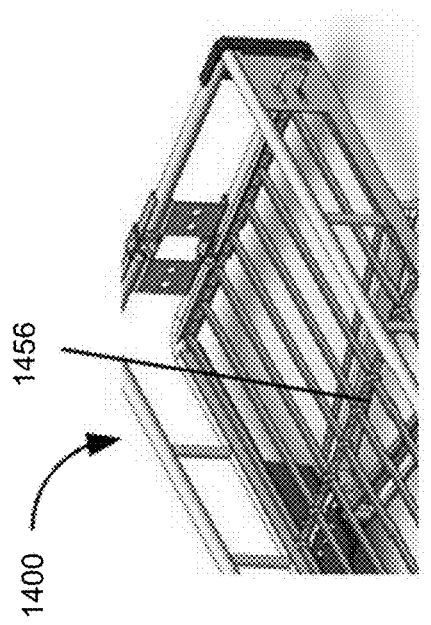
FIGS. 19A, 19B, and 19C illustrates an example hinge connection for the cargo platform, according to the teachings of this disclosure.
Figure 19A:
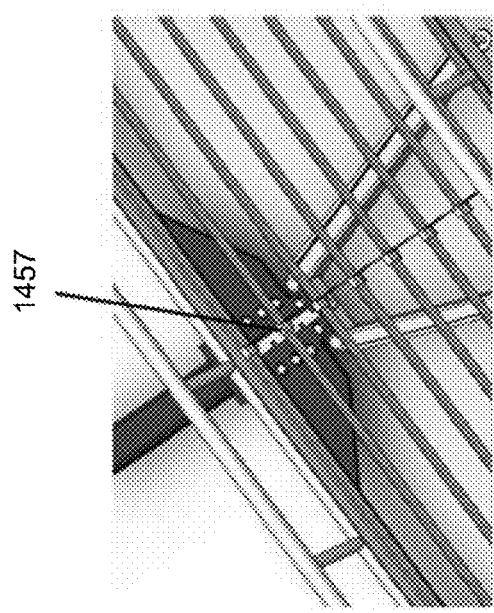
Figure 19C:
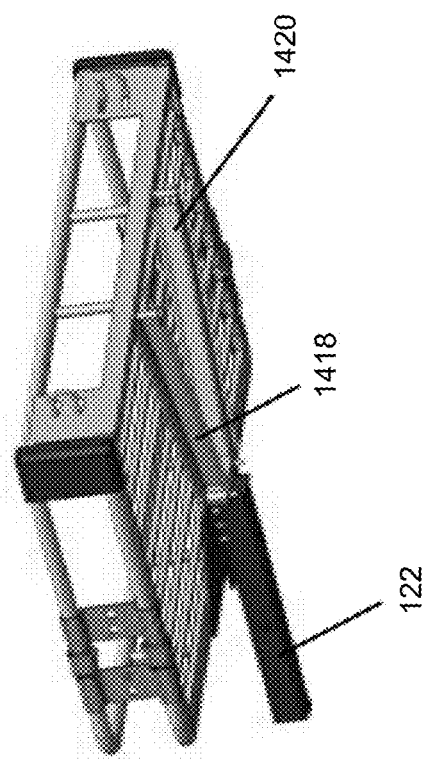
Figure 20A:
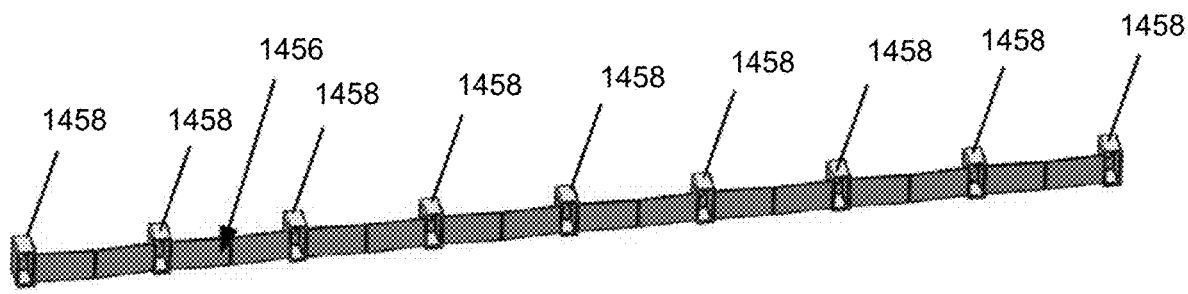
FIGS. 20A and 20B illustrate an example collapsible flooring for a cargo platform in an open state and a closed state respectively, according to the teachings of this disclosure.
Figure 20B:
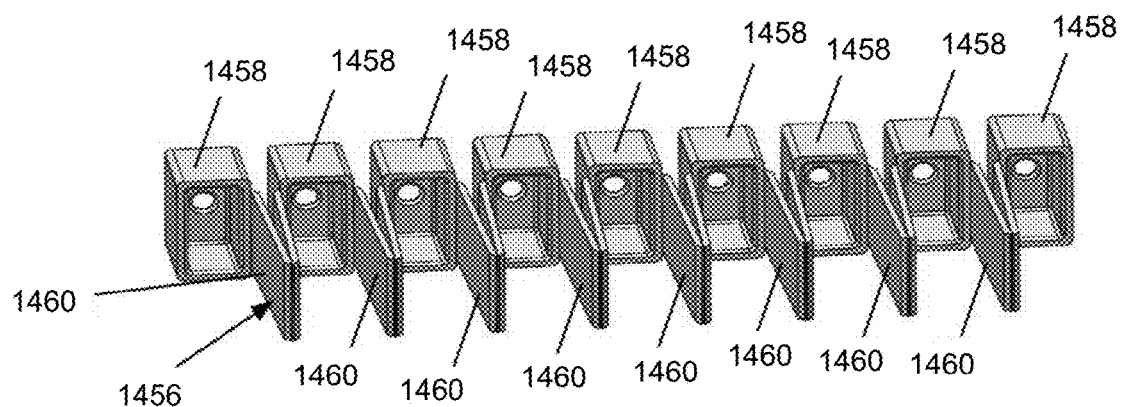
Figure 20C:
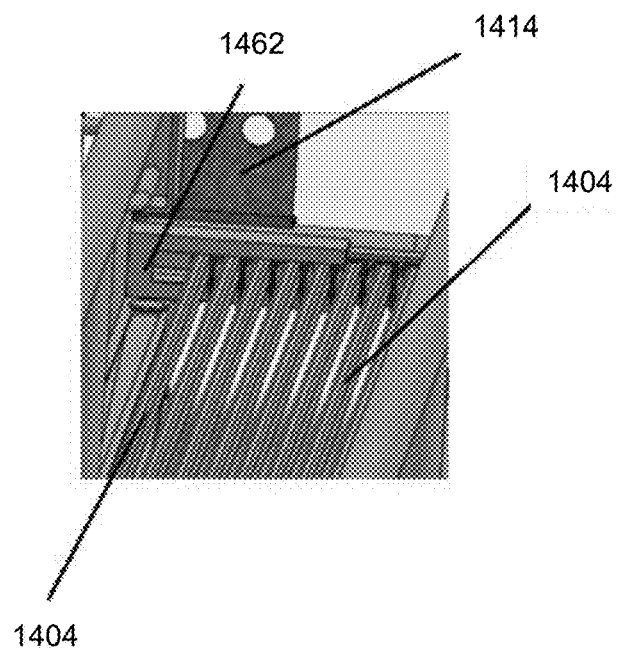
FIGS. 20C and 20D illustrate a close up view of the example collapsible flooring of FIGS. 20A and 20B in the closed state and the open state respectively, according to the teachings of this disclosure.
Figure 20D:
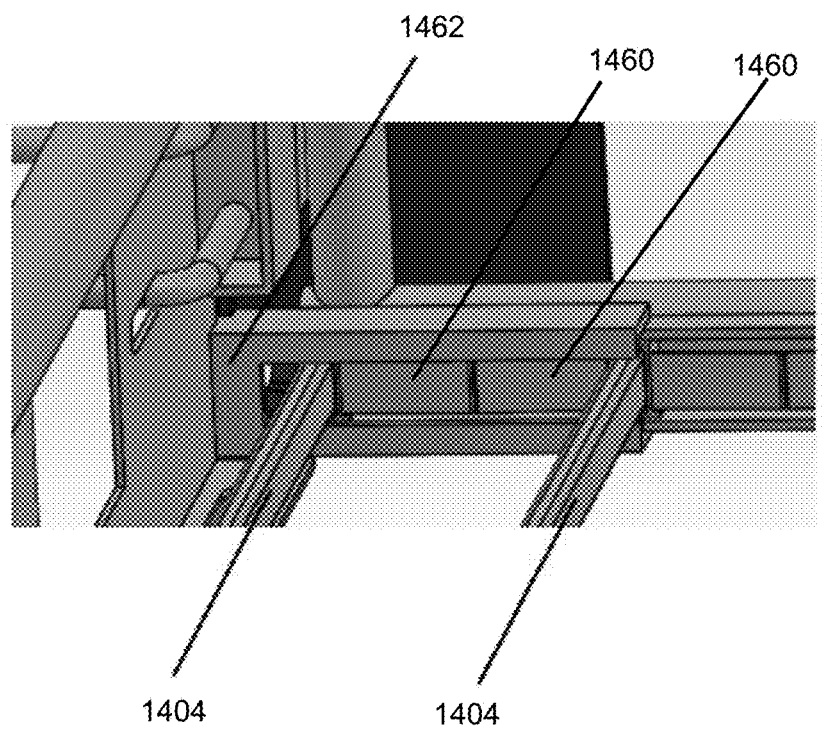

FIGS. 19A, 19B, and 19C further illustrate a hinge setup for the cargo platform 1400. In FIGS. 19A, 19B, and 19C, the support members 1418 and 1420 (sometimes referred to as "guides") are, as noted above, designed to be slidable or telescoping so that the support members 1418 and 1420 can be reduced in length when the cargo platform 1400 is in the closed position. In the illustrated examples, a living hinge 1456 is located proximate to the center of the foldable floor 1404 formed from a plurality of rod-shaped floor members. FIG. 20A, 20B, 20C, and 20D illustrate the living hinge 1456 in further detail. In the illustrate examples, each of the rod-shaped floor member mays be made up of two sub-portions with each of the sub-portions being operatively connected to one another via one coupling element 1458 of the living hinge 1456. The living hinge 1456 also includes flexible folding portions 1460 that connect adjacent ones of the coupling elements 1458 and are configured to be collapsible. In some examples, if there are "n" ones of the coupling elements 1456 then there are "n−1" ones of the folding portions 1460 that connect the plurality of the coupling elements 1458 to one another. FIGS. 20A and 20D show the living hinge 1456 in the open position. FIGS. 20B and 20C show the living hinge 1456 in the closed position.

The living hinge 1456 of FIGS. 19A, 19B, 19C, 20A, 20B, 20C, and 20D creates a slip joint for the floor that facilitates, for example, a smooth open and closed function, high durability in relation to an open/close duty cycle count; minimal wear, minimal NVH (squeaking noise), a simplified manufacturing assembly design, and/or the ability to integrate dissimilar metals into the design of various elements of the cargo platform 1400.

Figure 21:
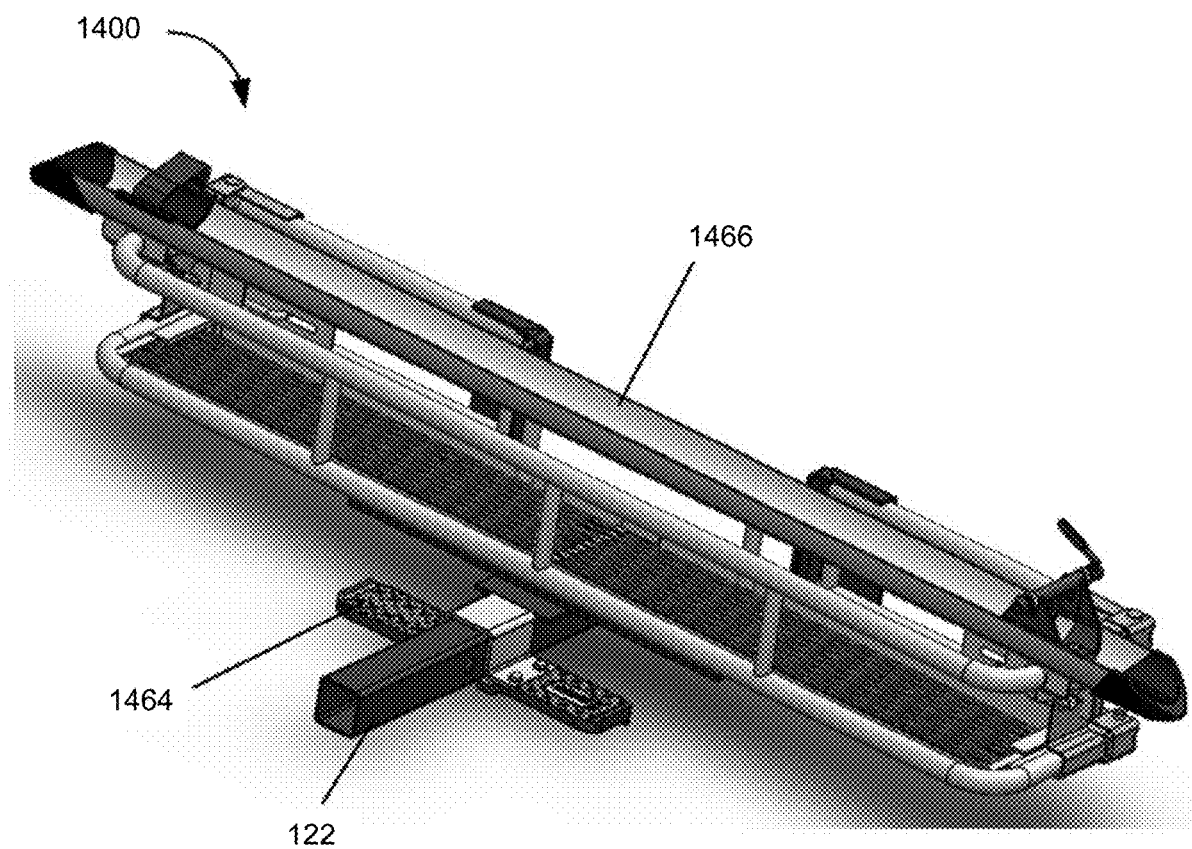
FIG. 21 illustrates a cargo platform system, according to the teachings of this disclosure.

FIG. 21 illustrates the cargo platform 1400 with additional features added thereto. While these additional features are illustrated in connection with the cargo platform 1400, they may be utilized with any of the cargo platforms described herein. A step 1464 may be secured on the shank 122 or a bike carrier element 1466 may be secured to cargo platform 1400 that can be utilized in both the open and closed position. Other accessories may include one or more of a brake light kit, or kits, two or more bicycle carriers of the same or different types, a carrier bag that can be secured via any suitable means to any of the cargo platform, a product lock for locking any suitable product to any of the cargo platform, tray or basket, one or more steps of any style (i.e., simple to origami style), a license plate adaptor, a retractable cargo net kit (snap on), and/or one or more back-up cameras and/or sensors, etc.

Figure 22:
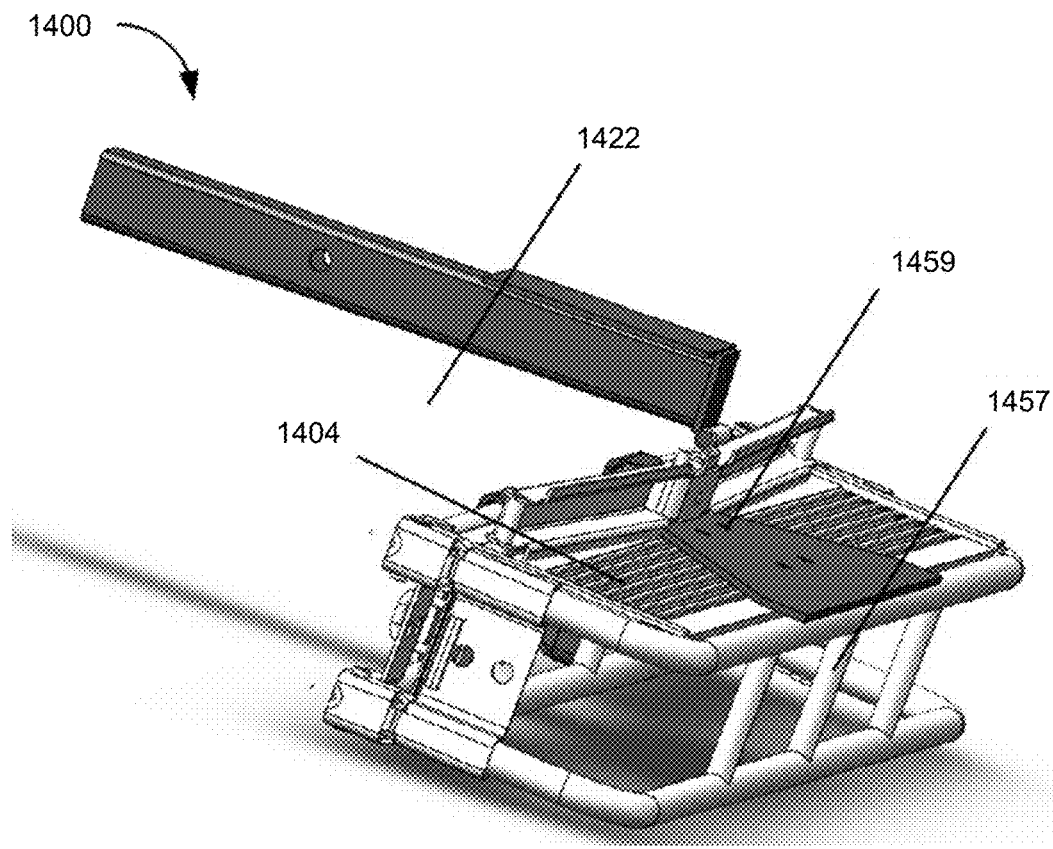
FIGS. 22 and 23 illustrate an example shank with an articulating hinge so as to permit the cargo platform to be inverted, according to the teachings of this disclosure.
Figure 23:
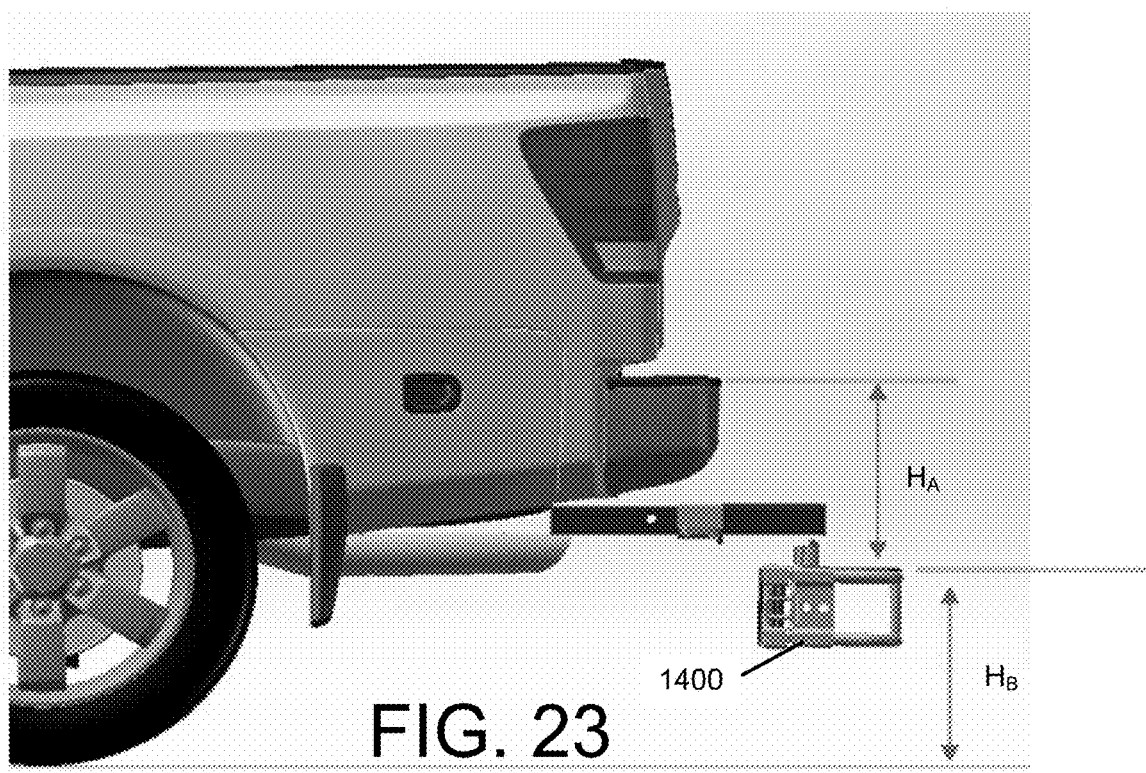

FIGS. 22 and 23 illustrate an embodiment where the shank 112 further includes a articulating hinge 1458 that permits cargo platform 1400 to be inverted into an upside down orientation. While the cargo platform 1400 is illustrated, the shank 112 with the articulating hinge 1458 may be used with any of the cargo platforms described herein. FIG. 23 illustrates the cargo platform 1400 inverted in an upside down orientation. In the upside down orientation a bottom surface of the cargo platform 1400 may be a first height (HA) from the bed of a top of a bumper of the vehicle and as second height (HB) from the ground. In some examples, the articulating hinge 1458 may be configured such that the first height (HA) is substantially equal to the second height (HB) (e.g., 15 inches, etc.) to, for example, provide the bottom surface of the cargo platform 1400 as a step and/or a seat.

Figure 24A:
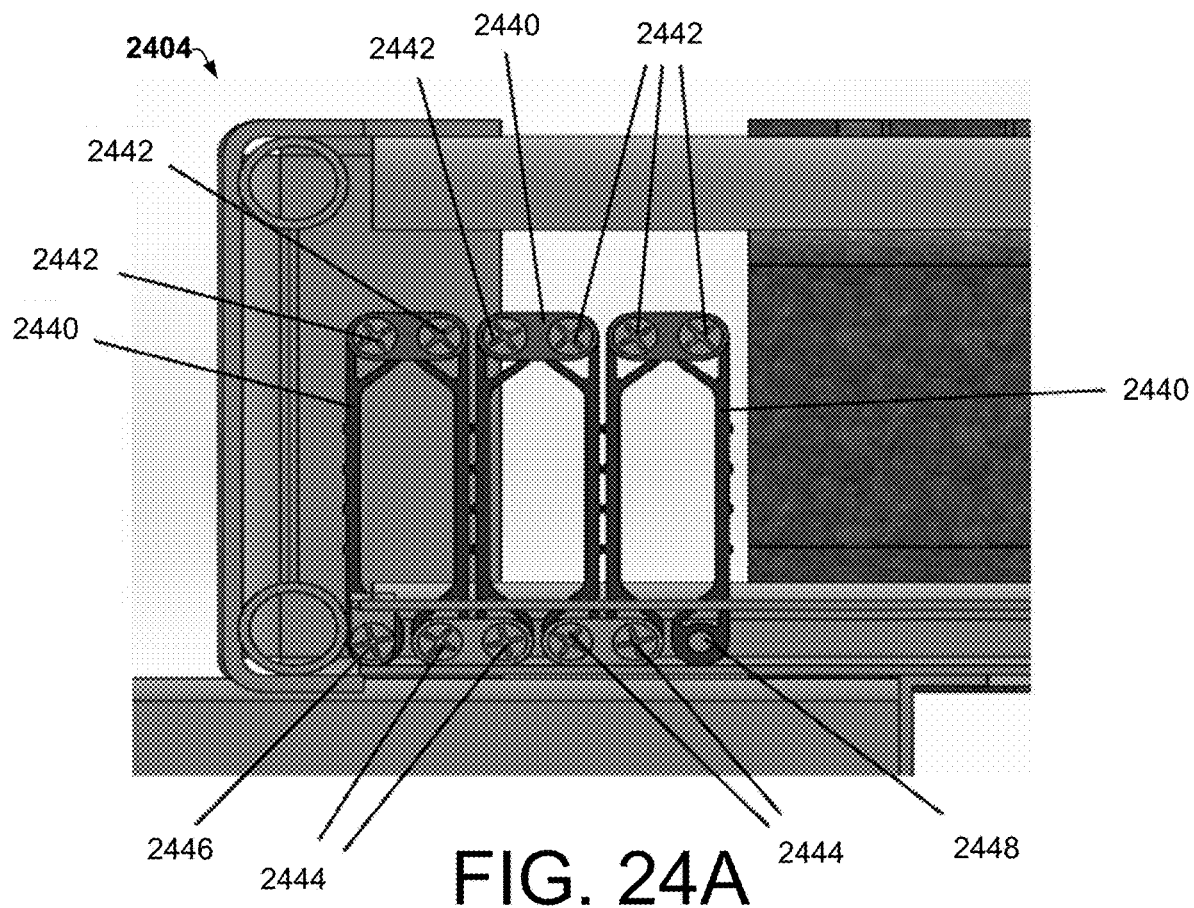
FIGS. 24A and 24B illustrate an example collapsible flooring for a cargo platform in an open state and a closed state respectively, according to the teachings of this disclosure.
Figure 24B:
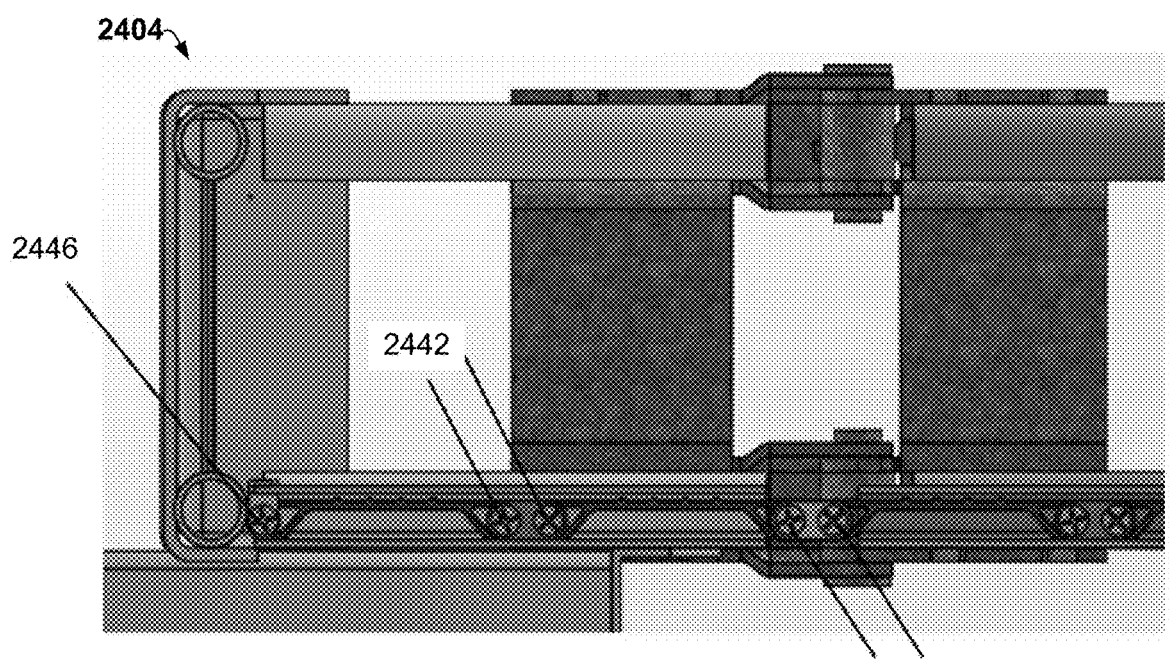

FIGS. 24A and 24B illustrate an example of a folding floor 2404. As illustrated in FIG. 24A, floor 2404 is formed from multiple folding floor slats 2440 that have a suitable number of rotatable upper cams 2442 and a suitable number of rotatable lower cams 2444 that permit the slats 2440 to move from a horizontal unfolded position to a vertical folded/nested position. The cams 2444 not only fold/rotate but to slide horizontally in left and right floor tracks. The floor 2404 is rotatably fixed to at least a portion of the frame of cargo platform so that the floor 2404 is foldable in only one direction, while another opposite end 2448 of the floor 2404 is free of a rotatable cam and is able to slide freely forward and backward in the left and right floor tracks. FIG. 24A illustrates the cams 2442 and 2444 oriented in a folded state. FIG. 24B illustrates the cams 2442 and 2444 oriented in an unfolded state.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A cargo platform with an open position and a closed position, the cargo platform comprising: a frame including:
   a front portion;
   a rear portion;
   first and second stationary side portions coupled to the front portion;
   first and second rotatable side portions; and
   a first hinge element to rotatably couple the first rotatable side portion directly to the rear portion; and
   a second hinge element to rotatably couple the second rotatable side portion directly to the rear portion; and
   a foldable floor including a first floor, second floor rotatably connected to the first floor, and a third floor rotatably connected to the second floor, the first floor being coupled to the front portion and the third floor being coupled to the rear portion.

2. The cargo platform of claim 1, wherein the frame further includes:
   a first sleeve connector to on the first rotatable side portion to selectively couple to the first stationary side portion; and
   a second sleeve connector on the second rotatable side portion to selectively couple to the second stationary side portion.

3. The cargo platform of claim 2, wherein each of the first sleeve connector and the second sleeve connector define an open locking aperture and a closed locking aperture.

4. The cargo platform of claim 3, wherein each of the first rotatable side portion and the second rotatable side portion include a push button spring pin to selectively engage with the open locking aperture and a closed locking aperture.

5. The cargo platform of claim 4, for each of the first stationary side portion and the second stationary side portion:
   the push button spring pin is to engage with the open locking aperture when coupling the stationary side portion to the corresponding rotatable side portion
   the push button spring pin is engage with the closed locking aperture when not coupling the stationary side portion to the corresponding rotatable side portion.

6. The cargo platform of claim 1, wherein the frame further includes:
   a latching knob coaxial with the first hinge element; and
   a flexible latch affixed to the front portion configured to engage with the latching knob when the cargo platform is in the closed position.

7. The cargo platform of claim 6, wherein the flexible latch includes a base and defines a latching aperture and a handle aperture, and wherein the latching aperture is configured to engage with the latching knob when the cargo platform is in the closed position.

8. The cargo platform of claim 7, wherein the rear portion defines a latch hole, and wherein the base of the flexible latch is press fit into the latch hole.

9. The cargo platform of claim 1, wherein each of the hinge elements includes a push button spring pin and defines a first locking aperture along a first position of a circumference of the hinge element and a second locking aperture along a second position of a circumference of the hinge element.

10. The cargo platform of claim 9, wherein the first position 1 s 90 degrees along the circumference of the hinge element compared to the second position.

11. The cargo platform of claim 1, wherein the front portion includes a handle and the rear portion defines a clearance to accept the handle with the cargo platform in the closed position.

12. A cargo platform with an open position and a closed position, the cargo platform comprising: a frame including:
   a front portion;
   a rear portion;
   first and second stationary side portions coupled to the front portion;
   first and second rotatable side portions;
   a latching knob coaxial with the first hinge element; and
   a flexible latch affixed to the front portion configured to engage with the latching knob when the cargo platform is in the closed position; a first hinge element to rotatably couple the first rotatable side portion to the rear portion; and
   a second hinge element to rotatably couple the second rotatable side portion directly to the rear portion; and
   a foldable floor including a first floor, second floor rotatably connected to the first floor, and a third floor rotatably connected to the second floor, the first floor being coupled to the front portion and the third floor being coupled to the rear portion.

13. The cargo platform of claim 12, wherein the frame further includes:
   a first sleeve connector to on the first rotatable side portion to selectively couple to the first stationary side portion; and
   a second sleeve connector on the second rotatable side portion to selectively couple to the second stationary side portion.

14. The cargo platform of claim 13, wherein each of the first sleeve connector and the second sleeve connector define an open locking aperture and a closed locking aperture.

15. The cargo platform of claim 14, wherein each of the first rotatable side portion and the second rotatable side portion include a push button spring pin to selectively engage with the open locking aperture and a closed locking aperture.

16. The cargo platform of claim 12, wherein the front portion includes a handle and the rear portion defines a clearance to accept the handle with the cargo platform in the closed position.

17. A cargo platform with an open position and a closed position, the cargo platform comprising: a frame including:
   a front portion including a handle;
   a rear portion which defines a clearance to accept the handle with the cargo platform in the closed position;
   first and second stationary side portions coupled to the front portion;
   first and second rotatable side portions; and
   a first hinge element to rotatably couple the first rotatable side portion to the rear portion; and
   a second hinge element to rotatably couple the second rotatable side portion to the rear portion; and
   a foldable floor including a first floor, second floor rotatably connected to the first floor, and a third floor rotatably connected to the second floor, the first floor being coupled to the front portion and the third floor being coupled to the rear portion.

18. The cargo platform of claim 17, wherein the frame further includes:
   a first sleeve connector to on the first rotatable side portion to selectively couple to the first stationary side portion; and a second sleeve connector on the second rotatable side portion to selectively couple to the second stationary side portion.

19. The cargo platform of claim 18, wherein each of the first sleeve connector and the second sleeve connector define an open locking aperture and a closed locking aperture.

20. The cargo platform of claim 17, wherein the frame further includes:

a latching knob coaxial with the first hinge element; and
a flexible latch affixed to the front portion configured to engage with the latching.

* * * * *